(12) United States Patent
Xu et al.

(10) Patent No.: US 10,181,989 B2
(45) Date of Patent: Jan. 15, 2019

(54) SERVICE CHAIN FAULT DETECTION METHOD AND APPARATUS

(71) Applicant: HUAWEI TECHNOLOGIES CO., LTD., Shenzhen, Guangdong (CN)

(72) Inventors: Weiping Xu, Shenzhen (CN); Lehong Niu, Shenzhen (CN); Xuhui Bai, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 50 days.

(21) Appl. No.: 15/360,234

(22) Filed: Nov. 23, 2016

(65) Prior Publication Data

US 2017/0078175 A1 Mar. 16, 2017

Related U.S. Application Data

(63) Continuation of application No. PCT/CN2015/078510, filed on May 8, 2015.

(30) Foreign Application Priority Data

May 26, 2014 (CN) .......................... 2014 1 0224672

(51) Int. Cl.
*H04L 12/26* (2006.01)
*H04L 12/24* (2006.01)
(Continued)

(52) U.S. Cl.
CPC .......... *H04L 43/0811* (2013.01); *H04L 12/24* (2013.01); *H04L 45/20* (2013.01); *H04L 45/26* (2013.01)

(58) Field of Classification Search
CPC .............................. H04L 45/26; H04L 43/022
(Continued)

(56) References Cited

U.S. PATENT DOCUMENTS

| 7,895,425 B2 | 2/2011 | Khalid et al. |
| 2008/0112331 A1 | 5/2008 | Long et al. |

(Continued)

FOREIGN PATENT DOCUMENTS

| CN | 101174975 A | 5/2008 |
| CN | 101179479 A | 5/2008 |

(Continued)

OTHER PUBLICATIONS

Chinese Office Action dated Jan. 19, 2018 in corresponding Chinese Patent Application No. 201410224672.0, 7 pp.
(Continued)

*Primary Examiner* — Iqbal Zaidi
(74) *Attorney, Agent, or Firm* — Staas & Halsey LLP

(57) ABSTRACT

This application discloses a service chain fault detection method and an apparatus. The method includes: obtaining, by a service forwarding entity SFE, a first fault tracing detection request packet, and then determining to communicate with a first service function SF node, where the first fault tracing detection request packet includes a path identifier ID and an address of a device for initiating fault detection, and the path ID is used to identify a path of a service chain; obtaining, by the SFE, an ID of the first SF node; and sending, by the SFE, a first fault tracing detection response packet to the device for initiating fault detection, where the first fault tracing detection response packet includes the path ID, the ID of the first SF node, and the address of the device for initiating fault detection.

18 Claims, 10 Drawing Sheets

(51) Int. Cl.
*H04L 12/733* (2013.01)
*H04L 12/721* (2013.01)

(58) Field of Classification Search
USPC .......................... 370/230–411; 455/41, 414
See application file for complete search history.

(56) References Cited

U.S. PATENT DOCUMENTS

| | | |
|---|---|---|
| 2009/0037713 A1 | 2/2009 | Khalid et al. |
| 2010/0303073 A1 | 12/2010 | Kubo et al. |
| 2015/0227404 A1* | 8/2015 | Rajagopal ............ G06F 11/0748 714/37 |
| 2015/0236948 A1* | 8/2015 | Dunbar ................... H04L 45/22 370/225 |
| 2016/0254998 A1* | 9/2016 | Jokela ................... H04L 45/308 370/390 |

FOREIGN PATENT DOCUMENTS

| | | |
|---|---|---|
| CN | 102347850 A | 2/2012 |
| EP | 2595344 A2 | 5/2013 |
| WO | 2012/154751 A1 | 11/2012 |

OTHER PUBLICATIONS

International Search Report, dated Jul. 30, 2015, in International Application No. PCT/CN2015/078510 (4 pp.).
International Search Report dated Jul. 30, 2015 in corresponding International Patent Application No. PCT/CN2015/078510.
Extended European Search Report dated May 24, 2017 in corresponding European Patent Application No. 15800466.3.

* cited by examiner

SERVICE CHAIN FAULT DETECTION METHOD AND APPARATUS

CROSS-REFERENCE TO RELATED APPLICATIONS

This application is a continuation of International Application No. PCT/CN2015/078510, filed on May 8, 2015, which claims priority to Chinese Patent Application No. 201410224672.0, filed on May 26, 2014. The disclosures of the aforementioned applications are hereby incorporated by reference in their entireties.

TECHNICAL FIELD

The present invention relates to communications technologies, and in particular, to a service chain fault detection method, a service forwarding apparatus, a device for initiating fault detection, and a service function apparatus.

BACKGROUND

In addition to providing basic forwarding functions such as switching and routing, a general network device may further provide a value-added service (VAS). For example, the VAS may be a service such as network address translation (NAT) or a firewall.

In a network that provides a value-added service, a service chain (service chain) includes a service classifier (service classifier) and N service forwarding entities (SFE). The SFEs included in the service chain are successively connected. The SFE may be connected to one or more service function (SF) nodes. According to a service to which a received packet belongs, the service classifier adds an identifier of the service chain to the packet, to obtain a service packet. The service classifier sends the service packet to an SFE connected to the service classifier. The SFE sends the received service packet to an SF node that is connected to the SFE and that belongs to the service chain, and the SF node performs service processing on the service packet.

To implement normal forwarding of the service packet, a detection device in the network may detect whether the SFE, the SF node, and the service classifier can forward the service packet. When the SFE can forward the service packet to the SF node that is connected to the SFE and that belongs to the service chain, the detection device cannot detect whether an order in which the SFE forwards the service packet to an SF node belonging to the service chain is correct, that is, the detection device cannot learn an SF node that the service packet passes through when being forwarded on the service chain.

SUMMARY

In view of the foregoing, embodiments of the present invention provide a service chain fault detection method, a service forwarding apparatus, a device for initiating fault detection, and a service function apparatus, which are helpful to learn an SF node that a service packet passes through when being forwarded on a service chain.

The technical solutions provided in the embodiments of the present invention are as follows:

According to a first aspect, a service chain fault detection method is provided, including:

obtaining, by an SFE, a first fault tracing detection request packet, and then determining to communicate with a first SF node, where the first fault tracing detection request packet includes a path ID and an address of a device for initiating fault detection, and the path ID is used to identify a path of a service chain;

obtaining, by the SFE, an ID of the first SF node; and sending, by the SFE, a first fault tracing detection response packet to the device for initiating fault detection, where the first fault tracing detection response packet includes the path ID, the ID of the first SF node, and the address of the device for initiating fault detection.

In a first possible implementation manner of the foregoing first aspect, the determining, by an SFE, to communicate with a first SF node on the service chain includes:

determining, by the SFE according to the path ID, to forward the first fault tracing detection request packet according to a first forwarding entry, where the first forwarding entry includes the path ID and an address of the first SF node;

sending, by the SFE, the first fault tracing detection request packet to the first SF node according to the address of the first SF node; and receiving, by the SFE, a second fault tracing detection request packet from the first SF node, where the second fault tracing detection request packet includes the path ID and the address of the device for initiating fault detection.

With reference to the first possible implementation manner of the foregoing first aspect, a second possible implementation manner of the first aspect is further provided, where the first fault tracing detection request packet further includes a first parameter, the first parameter is used to identify the first SF node or is used to identify a previous-hop SF node of the first SF node on the service chain, and the first forwarding entry further includes the first parameter; and the determining, by the SFE according to the path ID, to forward the first fault tracing detection request packet according to a first forwarding entry includes: determining, by the SFE according to the first parameter and the path ID, to forward the first fault tracing detection request packet according to the first forwarding entry.

With reference to the second possible implementation manner of the foregoing first aspect, a third possible implementation manner of the first aspect is further provided, where the first fault tracing detection request packet further includes a time to live (TTL) field;

after the receiving, by the SFE, a second fault tracing detection request packet from the first SF node, the method further includes: obtaining, by the SFE, a TTL parameter, where the TTL parameter is data obtained after a value of the TTL field in the first fault tracing detection request packet is updated; and the sending, by the SFE, a first fault tracing detection response packet to the device for initiating fault detection includes: when the TTL parameter is equal to a preset value, sending, by the SFE, the first fault tracing detection response packet to the device for initiating fault detection.

With reference to the third possible implementation manner of the foregoing first aspect, a fourth possible implementation manner of the first aspect is further provided, where the method further includes:

when the TTL parameter is not equal to the preset value, obtaining, by the SFE, a third fault tracing detection request packet, where the third fault tracing detection request packet includes a second parameter, the path ID, a TTL field, and the address of the device for initiating fault detection, and the second parameter is used to identify a next-hop SF node of an SF node, on the service chain, identified by using the first parameter;

determining, by the SFE according to the second parameter and the path ID, to forward the third fault tracing detection request packet according to a second forwarding entry, where the second forwarding entry includes the path ID, the second parameter, and an address of a first device, the first device is a next-hop SFE of the SFE on the service chain or a second SF node, and the second SF node is a next-hop SF node of the first SF node on the service chain; and sending, by the SFE, the third fault tracing detection request packet to the first device according to the address of the first device.

With reference to the second possible implementation manner of the foregoing first aspect, a fifth possible implementation manner of the first aspect is further provided, where before the sending, by the SFE, a first fault tracing detection response packet to the device for initiating fault detection, the method further includes:

sending, by the SFE, a second fault tracing detection response packet to the device for initiating fault detection, where the second fault tracing detection response packet includes the path ID, an ID of the SFE, and the address of the device for initiating fault detection.

With reference to the second possible implementation manner of the foregoing first aspect or the fifth possible implementation manner of the first aspect, a sixth possible implementation manner of the first aspect is further provided, where after the sending, by the SFE, a first fault tracing detection response packet to the device for initiating fault detection, the method further includes:

obtaining, by the SFE, a fourth fault tracing detection request packet, where the fourth fault tracing detection request packet includes a second parameter, the path ID, and the address of the device for initiating fault detection, and the second parameter is used to identify a next-hop SF node of an SF node, on the service chain, identified by using the first parameter;

determining, by the SFE according to the second parameter and the path ID, to forward the fourth fault tracing detection request packet according to a second forwarding entry, where the second forwarding entry includes the path ID, the second parameter, and an address of a first device, the first device is a next-hop SFE of the SFE on the service chain or a second SF node, and the second SF node is a next-hop SF node of the first SF node on the service chain; and sending, by the SFE, the fourth fault tracing detection request packet to the first device according to the address of the first device.

With reference to the sixth possible implementation manner of the foregoing first aspect, a seventh possible implementation manner of the first aspect is further provided, where the first device is the second SF node, and the method further includes:

receiving, by the SFE, a fifth fault tracing detection request packet from the second SF node, where the fifth fault tracing detection request packet includes the path ID and the address of the device for initiating fault detection;

obtaining, by the SFE, an ID of the second SF node according to the fifth fault tracing detection request packet; and sending, by the SFE, a third fault tracing detection response packet to the device for initiating fault detection, where the third fault tracing detection response packet includes the path ID, the ID of the second SF node, and the address of the device for initiating fault detection.

With reference to the first possible implementation manner of the foregoing first aspect, the second possible implementation manner of the first aspect, the fifth possible implementation manner of the first aspect, the sixth possible implementation manner of the first aspect, or the seventh possible implementation manner of the first aspect, an eighth possible implementation manner of the first aspect is further provided, where the method further includes:

adding, by the SFE, at least one of the first parameter or the ID of the SFE to the first fault tracing detection response packet.

With reference to the first possible implementation manner of the foregoing first aspect, the second possible implementation manner of the first aspect, the fifth possible implementation manner of the first aspect, the sixth possible implementation manner of the first aspect, or the seventh possible implementation manner of the first aspect, a ninth possible implementation manner of the first aspect is further provided, where the first fault tracing detection request packet further includes a node list, and the node list includes an ID of the previous-hop SF node of the first SF node on the service chain; and before the sending, by the SFE, a first fault tracing detection response packet to the device for initiating fault detection, the method further includes:

obtaining, by the SFE, an updated node list, where the updated node list is a list generated after the ID of the first SF node is added to the node list, and an order of all SF nodes included in the updated node list is the same as an order of all the SF nodes on the service chain; and adding, by the SFE, the updated node list to the first fault tracing detection response packet.

With reference to any one of the first possible implementation manner of the foregoing first aspect, the second possible implementation manner of the first aspect, or the fifth possible implementation manner of the first aspect to the ninth possible implementation manner of the first aspect, a tenth possible implementation manner of the first aspect is further provided, where the first fault tracing detection request packet further includes an ID of an SF node used as an end point; and after the sending, by the SFE, a first fault tracing detection response packet to the device for initiating fault detection, the method further includes:

ending, by the SFE, detection on the service chain when the ID of the first SF node is the same as the ID of the SF node used as the end point.

With reference to any one of the foregoing first aspect or possible implementation manners of the first aspect, an eleventh possible implementation manner of the first aspect is further provided, where the obtaining, by an SFE, a first fault tracing detection request packet includes:

receiving, by the SFE, the first fault tracing detection request packet sent by the device for initiating fault detection; or receiving, by the SFE, the first fault tracing detection request packet sent by a previous-hop SFE of the SFE on the service chain; or generating, by the SFE, the first fault tracing detection request packet.

With reference to any one of the foregoing first aspect or possible implementation manners of the first aspect, a twelfth possible implementation manner of the first aspect is further provided, where the sending, by the SFE, a first fault tracing detection response packet to the device for initiating fault detection includes:

obtaining, by the SFE, a path ID of a reverse service chain of the service chain by using the path ID, where the reverse service chain and the service chain are opposite in direction; and sending, by the SFE according to a forwarding entry corresponding to the path ID of the reverse service chain, the first fault tracing detection response packet to the device for initiating fault detection, where the forwarding entry corresponding to the path ID of the reverse service chain includes the path ID of the reverse service chain and the address of the device for initiating fault detection; or the sending, by the SFE, a first fault tracing detection response packet to the device for initiating fault detection includes:

adding, by the SFE, the first fault tracing detection response packet to a unicast Internet Protocol (IP) packet, and sending the unicast IP packet to the device for initiating fault detection, where a destination IP address in the unicast IP packet is the address of the device for initiating fault detection.

According to a second aspect, a service chain fault detection method is provided, including:

sending, by a device for initiating fault detection, a first fault tracing detection request packet to an SFE, where the first fault tracing detection request packet includes a path identifier ID and an address of the device for initiating fault detection, and the path ID is used to identify a path of a service chain;

receiving, by the device for initiating fault detection, a first fault tracing detection response packet from the SFE, where the first fault tracing detection response packet includes the path ID, an ID of a first SF node, and the address of the device for initiating fault detection; and after receiving the first fault tracing detection response packet, determining, by the device for initiating fault detection, that the service chain passes through the first SF node, and forwarding between the SFE and the first SF node is normal.

In a first possible implementation manner of the second aspect, the sending, by a device for initiating fault detection, a first fault tracing detection request packet to the SFE includes:

determining, according to the path ID by the device for initiating fault detection, to forward the first fault tracing detection request packet according to a forwarding entry, where the forwarding entry includes the path ID and an address of the SFE; and sending, by the device for initiating fault detection, the first fault tracing detection request packet to the SFE according to the address of the SFE.

With reference to the foregoing second aspect or the first possible implementation manner of the second aspect, a second possible implementation manner of the second aspect is further provided, where the first fault tracing detection request packet further includes a first parameter, and the first parameter is used to identify the first SF node or is used to identify a previous-hop SF node of the first SF node on the service chain.

With reference to the foregoing second aspect, the first possible implementation manner of the second aspect, or the second possible implementation manner of the second aspect, a third possible implementation manner of the second aspect is further provided, where the first fault tracing detection request packet further includes a TTL field.

With reference to the foregoing second aspect, the first possible implementation manner of the second aspect, or the second possible implementation manner of the second aspect, a fourth possible implementation manner of the second aspect is further provided, where the first fault tracing detection request packet further includes a node list, and the node list includes an ID of the previous-hop SF node of the first SF node on the service chain; and the first fault tracing detection response packet further includes an updated node list, the updated node list is a list generated after the ID of the first SF node is added to the node list, and an order of all SF nodes included in the updated node list is the same as an order of all the SF nodes on the service chain.

With reference to the foregoing second aspect, the first possible implementation manner of the second aspect, or the second possible implementation manner of the second aspect, a fifth possible implementation manner of the second aspect is further provided, where before the receiving, by the device for initiating fault detection, a first fault tracing detection response packet from the SFE, the method further includes:

receiving, by the device for initiating fault detection, a second fault tracing detection response packet from the SFE, where the second fault tracing detection response packet includes the path ID, an ID of the SFE, and the address of the device for initiating fault detection; and after receiving the second fault tracing detection response packet, determining, by the device for initiating fault detection, that the service chain passes through the SFE, and forwarding between the SFE and the device for initiating fault detection is normal.

With reference to any one of the foregoing second aspect or possible implementation manners of the second aspect, a sixth possible implementation manner of the second aspect is further provided, where after the receiving, by the device for initiating fault detection, a first fault tracing detection response packet from the SFE, the method further includes:

receiving, by the device for initiating fault detection, a third fault tracing detection response packet from the SFE, where the third fault tracing detection response packet includes the path ID, an ID of a second SF node, and the address of the device for initiating fault detection, and the second SF node is a next-hop SF node of the first SF node on the service chain; and after receiving the third fault tracing detection response packet, determining, by the device for initiating fault detection, that the service chain passes through the second SF node, and forwarding between the SFE and the second SF node is normal.

According to a third aspect, a service chain fault detection method is provided, including:

receiving, by an SF node, a first fault tracing detection request packet from an SFE, where the first fault tracing detection request packet includes a path identifier ID and an address of a device for initiating fault detection, and the path ID is used to identify a path of a service chain; and sending, by the SF node, a second fault tracing detection request packet to the SFE, where the second fault tracing detection request packet includes the path ID and the address of the device for initiating fault detection.

In a first possible implementation manner of the third aspect, the first fault tracing detection request packet and the second fault tracing detection request packet each further includes a TTL field; and before the sending, by the SF node, a second fault tracing detection request packet to the SFE, the method further includes:

obtaining, by the SF node, a TTL parameter, where the TTL parameter is data obtained after a value of the TTL field included in the first fault tracing detection request packet is updated; and using, by the SF node, the TTL parameter as a value of the TTL field included in the second fault tracing detection request packet.

With reference to the foregoing third aspect, a second possible implementation manner of the third aspect is further provided, where the first fault tracing detection request packet further includes a node list, and the node list includes an ID of a previous-hop SF node of the SF node on the service chain; and before the sending, by the SF node, a second fault tracing detection request packet to the SFE, the method further includes:

obtaining, by the SF node, an updated node list, where the updated node list is a list generated after an ID of the SF node is added to the node list, and an order of all SF nodes in the updated node list is the same as an order of all the SF nodes on the service chain; and adding, by the SF node, the updated node list to the second fault tracing detection request packet.

With reference to the foregoing third aspect, the first possible implementation manner of the third aspect, or the second possible implementation manner of the third aspect, a third possible implementation manner of the third aspect is further provided, where the first fault tracing detection request packet further includes a first parameter, the first parameter is used to identify the SF node or is used to identify the previous-hop SF node of the SF node on the service chain, and the second fault tracing detection request packet further includes at least one of the first parameter or the ID of the SF node.

According to a fourth aspect, a service forwarding apparatus is provided, including:

a first communications unit, configured to: obtain a first fault tracing detection request packet, and then determine to communicate with a first SF node, where the first fault tracing detection request packet includes a path identifier ID and an address of a device for initiating fault detection, and the path ID is used to identify a path of a service chain;

a first obtaining unit, configured to obtain an ID of the first SF node; and a first sending unit, configured to send a first fault tracing detection response packet to the device for initiating fault detection, where the first fault tracing detection response packet includes the path ID, the ID of the first SF node, and the address of the device for initiating fault detection.

In a first possible implementation manner of the fourth aspect, the first communications unit is specifically configured to determine, according to the path ID, to forward the first fault tracing detection request packet according to a first forwarding entry, where the first forwarding entry includes the path ID and an address of the first SF node;

the first communications unit is specifically configured to send the first fault tracing detection request packet to the first SF node according to the address of the first SF node; and the first communications unit is specifically configured to receive a second fault tracing detection request packet from the first SF node, where the second fault tracing detection request packet includes the path ID and the address of the device for initiating fault detection.

With reference to the first possible implementation manner of the foregoing fourth aspect, a second possible implementation manner of the fourth aspect is further provided, where the first fault tracing detection request packet further includes a first parameter, the first parameter is used to identify the first SF node or is used to identify a previous-hop SF node of the first SF node on the service chain, and the first forwarding entry further includes the first parameter; and the first communications unit is further configured to determine, according to the first parameter and the path ID, to forward the first fault tracing detection request packet according to the first forwarding entry.

With reference to the second possible implementation manner of the foregoing fourth aspect, a third possible implementation manner of the fourth aspect is further provided, where the first fault tracing detection request packet further includes a TTL field;

the service forwarding apparatus further includes: a second obtaining unit;

the second obtaining unit is configured to obtain a TTL parameter, where the TTL parameter is data obtained after a value of the TTL field in the first fault tracing detection request packet is updated; and the first sending unit is further configured to: when the TTL parameter is equal to a preset value, send the first fault tracing detection response packet to the device for initiating fault detection.

With reference to the third possible implementation manner of the foregoing fourth aspect, a fourth possible implementation manner of the fourth aspect is further provided, where the service forwarding apparatus further includes: a third obtaining unit, a first determining unit, and a second sending unit, where the third obtaining unit is configured to: when the TTL parameter is not equal to the preset value, obtain a third fault tracing detection request packet, where the third fault tracing detection request packet includes a second parameter, the path ID, a TTL field, and the address of the device for initiating fault detection, the second parameter is used to identify a next-hop SF node of an SF node, on the service chain, identified by using the first parameter, and a value of the TTL field in the third fault tracing detection request packet is the TTL parameter;

the first determining unit is configured to determine, according to the second parameter and the path ID, to forward the third fault tracing detection request packet according to a second forwarding entry, where the second forwarding entry includes the path ID, the second parameter, and an address of a first device, the first device is a next-hop SFE of the service forwarding apparatus on the service chain or a second SF node, and the second SF node is a next-hop SF node of the first SF node on the service chain; and the second sending unit is configured to send the third fault tracing detection request packet to the first device according to the address of the first device.

With reference to the second possible implementation manner of the foregoing fourth aspect, a fifth possible implementation manner of the fourth aspect is further provided, where the first sending unit is further configured to send a second fault tracing detection response packet to the device for initiating fault detection, where the second fault tracing detection response packet includes the path ID, an ID of the service forwarding apparatus, and the address of the device for initiating fault detection.

With reference to the second possible implementation manner of the foregoing fourth aspect or the fifth possible implementation manner of the fourth aspect, a sixth possible implementation manner of the fourth aspect is further provided, where the service forwarding apparatus further includes:

a fourth obtaining unit, configured to obtain a fourth fault tracing detection request packet, where the fourth fault tracing detection request packet includes a second parameter, the path ID, and the address of the device for initiating fault detection, and the second parameter is used to identify a next-hop SF node of an SF node, on the service chain, identified by using the first parameter;

a second determining unit, configured to determine, according to the second parameter and the path ID, to forward the fourth fault tracing detection request packet according to a second forwarding entry, where the second forwarding entry includes the path ID, the second parameter, and an address of a first device, the first device is a next-hop SFE of the service forwarding apparatus on the service chain or a second SF node, and the second SF node is a next-hop SF node of the first SF node on the service chain; and a third sending unit, configured to send the fourth fault tracing detection request packet to the first device according to the address of the first device.

With reference to the sixth possible implementation manner of the foregoing fourth aspect, a seventh possible implementation manner of the fourth aspect is further provided, where the service forwarding apparatus further includes:

a receiving unit, configured to receive a fifth fault tracing detection request packet from the second SF node, where the fifth fault tracing detection request packet includes the path ID and the address of the device for initiating fault detection; and a fifth obtaining unit, configured to obtain an ID of the second SF node according to the fifth fault tracing detection request packet; and the first sending unit is further configured to send a third fault tracing detection response packet to the device for initiating fault detection, where the third fault tracing detection response packet includes the path ID, the ID of the second SF node, and the address of the device for initiating fault detection.

With reference to the first possible implementation manner of the foregoing fourth aspect, the second possible implementation manner of the fourth aspect, the fifth possible implementation manner of the fourth aspect, the sixth possible implementation manner of the fourth aspect, or the seventh possible implementation manner of the fourth aspect, an eighth possible implementation manner of the fourth aspect is further provided, where the first obtaining unit is further configured to add at least one of the first parameter or the ID of the service forwarding apparatus to the first fault tracing detection response packet.

With reference to the first possible implementation manner of the foregoing fourth aspect, the second possible implementation manner of the fourth aspect, the fifth possible implementation manner of the fourth aspect, the sixth possible implementation manner of the fourth aspect, or the seventh possible implementation manner of the fourth aspect, a ninth possible implementation manner of the fourth aspect is further provided, where the first fault tracing detection request packet further includes a node list, and the node list includes an ID of the previous-hop SF node of the first SF node on the service chain;

the service forwarding apparatus further includes:

a first parameter updating unit, configured to obtain an updated node list, where the updated node list is a list generated after the ID of the first SF node is added to the node list, and an order of all SF nodes included in the updated node list is the same as an order of all the SF nodes on the service chain; and the first obtaining unit is further configured to add the updated node list to the first fault tracing detection response packet.

With reference to any one of the first possible implementation manner of the foregoing fourth aspect, the second possible implementation manner of the fourth aspect, or the fifth possible implementation manner of the fourth aspect to the ninth possible implementation manner of the fourth aspect, a tenth possible implementation manner of the fourth aspect is further provided, where the first fault tracing detection request packet further includes an ID of an SF node used as an end point; and the service forwarding apparatus further includes:

a control unit, configured to: after the first sending unit sends the first fault tracing detection response packet to the device for initiating fault detection, determine that the ID of the first SF node is the same as the ID of the SF node used as the end point, and end detection on the service chain.

With reference to any one of the foregoing fourth aspect or possible implementation manners of the fourth aspect, an eleventh possible implementation manner of the fourth aspect is further provided, where the first communications unit is specifically configured to receive the first fault tracing detection request packet sent by the device for initiating fault detection; or the first communications unit is specifically configured to receive the first fault tracing detection request packet sent by a previous-hop SFE of the service forwarding apparatus on the service chain; or the first communications unit is specifically configured to generate the first fault tracing detection request packet.

With reference to any one of the foregoing fourth aspect or possible implementation manners of the fourth aspect, a twelfth possible implementation manner of the fourth aspect is further provided, where the first sending unit is specifically configured to obtain a path ID of a reverse service chain of the service chain by using the path ID, where the reverse service chain and the service chain are opposite in direction; and the first sending unit is specifically configured to send, according to a forwarding entry corresponding to the path ID of the reverse service chain, the first fault tracing detection response packet to the device for initiating fault detection, where the forwarding entry includes the path ID of the reverse service chain and the address of the device for initiating fault detection; or the first sending unit is specifically configured to: add the first fault tracing detection response packet to a unicast IP packet, and send the unicast IP packet to the device for initiating fault detection, where a destination IP address in the unicast IP packet is the address of the device for initiating fault detection.

According to a fifth aspect, a device for initiating fault detection is provided, including:

a sending unit, configured to send a first fault tracing detection request packet to an SFE, where the first fault tracing detection request packet includes a path ID and an address of the device for initiating fault detection, and the path ID is used to identify a path of a service chain;

a first receiving unit, configured to receive a first fault tracing detection response packet from the SFE, where the first fault tracing detection response packet includes the path ID, an ID of a first SF node, and the address of the device for initiating fault detection; and a first determining unit, configured to: after the first fault tracing detection response packet is received, determine that the service chain passes through the first SF node, and forwarding between the SFE and the first SF node is normal.

In a first possible implementation manner of the fifth aspect, the sending unit is specifically configured to determine, according to the path ID, to forward the first fault tracing detection request packet according to a forwarding entry, where the forwarding entry includes the path ID and an address of the SFE; and the sending unit is specifically configured to send the first fault tracing detection request packet to the SFE according to the address of the SFE.

With reference to the foregoing fifth aspect or the first possible implementation manner of the fifth aspect, a second possible implementation manner of the fifth aspect is further provided, where the first fault tracing detection request packet further includes a first parameter, and the first parameter is used to identify the first SF node or is used to identify a previous-hop SF node of the first SF node on the service chain.

With reference to the foregoing fifth aspect, the first possible implementation manner of the fifth aspect, or the second possible implementation manner of the fifth aspect, a third possible implementation manner of the fifth aspect is further provided, where the device for initiating fault detection further includes:

a first adding unit, configured to add a TTL field to the first fault tracing detection request packet.

With reference to the foregoing fifth aspect, the first possible implementation manner of the fifth aspect, or the second possible implementation manner of the fifth aspect, a fourth possible implementation manner of the fifth aspect is further provided, where the device for initiating fault detection further includes:

a second adding unit, configured to add a node list to the first fault tracing detection request packet, where the node list includes an ID of the previous-hop SF node of the first SF node on the service chain; and the first fault tracing detection response packet further includes an updated node list, the updated node list is a list generated after the ID of the first SF node is added to the node list, and an order of all SF nodes included in the updated node list is the same as an order of all the SF nodes on the service chain.

With reference to any one of the foregoing fifth aspect or possible implementation manners of the fifth aspect, a fifth possible implementation manner of the fifth aspect is further provided, where the device for initiating fault detection further includes:

a second receiving unit, configured to receive a second fault tracing detection response packet from the SFE, where the second fault tracing detection response packet includes the path ID, an ID of the SFE, and the address of the device for initiating fault detection; and the first determining unit is further configured to: after the second fault tracing detection response packet is received, determine that the service chain passes through the SFE, and forwarding between the SFE and the device for initiating fault detection is normal.

With reference to any one of the foregoing fifth aspect or possible implementation manners of the fifth aspect, a sixth possible implementation manner of the fifth aspect is further provided, where the device for initiating fault detection further includes:

a third receiving unit, configured to receive a third fault tracing detection response packet from the SFE, where the third fault tracing detection response packet includes the path ID, an ID of a second SF node, and the address of the device for initiating fault detection, and the second SF node is a next-hop SF node of the first SF node on the service chain; and the first determining unit is further configured to: after the third fault tracing detection response packet is received, determine that the service chain passes through the second SF node, and forwarding between the SFE and the second SF node is normal.

According to a sixth aspect, an SF apparatus is provided, including:

a receiving unit, configured to receive a first fault tracing detection request packet from an SFE, where the first fault tracing detection request packet includes a path identifier ID and an address of a device for initiating fault detection, and the path ID is used to identify a path of a service chain; and a sending unit, configured to send a second fault tracing detection request packet to the SFE, where the second fault tracing detection request packet includes the path ID and the address of the device for initiating fault detection.

In a first possible implementation manner of the sixth aspect, the first fault tracing detection request packet further includes a first parameter, the first parameter is used to identify the SF apparatus or is used to identify a previous-hop SF node of the SF apparatus on the service chain, and the second fault tracing detection request packet further includes at least one of the first parameter or an ID of the SF apparatus.

With reference to the foregoing sixth aspect or the first possible implementation manner of the sixth aspect, a second possible implementation manner of the sixth aspect is further provided, where the first fault tracing detection request packet and the second fault tracing detection request packet each further includes a TTL field;

the SF apparatus further includes:

a first parameter updating unit, configured to obtain a TTL parameter, where the TTL parameter is data obtained after a value of the TTL field included in the first fault tracing detection request packet is updated; and the first parameter updating unit is configured to use the TTL parameter as a value of the TTL field included in the second fault tracing detection request packet.

With reference to the foregoing sixth aspect or the first possible implementation manner of the sixth aspect, a third possible implementation manner of the sixth aspect is further provided, where the first fault tracing detection request packet further includes a node list, and the node list includes an ID of the previous-hop SF node of the SF apparatus on the service chain;

the SF apparatus further includes:

a second parameter updating unit, configured to obtain an updated node list, where the updated node list is a list generated after the ID of the SF apparatus is added to the node list, and an order of all SF nodes in the updated node list is the same as an order of all the SF nodes on the service chain; and the second parameter updating unit is configured to add the updated node list to the second fault tracing detection request packet.

According to the foregoing solutions, an SFE provided in the embodiments of the present invention obtains a first fault tracing detection request packet, then determines to communicate with a first SF node, and obtains an ID of the first SF node; and the SFE sends a first fault tracing detection response packet that includes the ID of the first SF node to a device for initiating fault detection, which helps the device for initiating fault detection to learn an SF node that a service packet passes through when being forwarded on a service chain.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and an ordinary person skilled in the art may still derive other drawings from these accompanying drawings.

DESCRIPTION OF EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are a part rather than all of the embodiments of the present invention. All other embodiments obtained by persons of ordinary skill in the art based on the embodiments of the present invention shall fall within the protection scope of the present invention.

Figure 1:
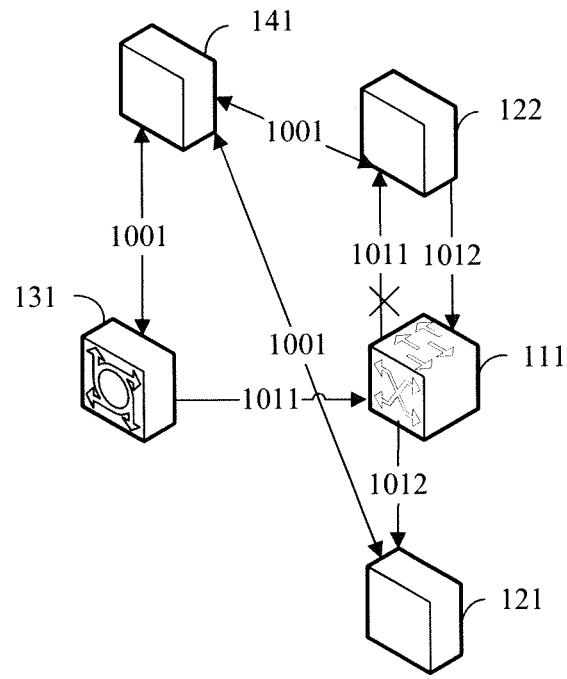
FIG. 1 is a schematic structural diagram of a network that provides a value-added service.

FIG. 1 is a schematic structural diagram of a network that provides a value-added service. The network shown in FIG. 1 includes a detection device 141, a service classifier 131, an SFE 111, an SF node 121, and an SF node 122. A service chain in the network shown in FIG. 1 includes the service classifier 131, the SFE 111, the SF node 121, and the SF node 122. A service processing order planned on the service chain is as follows: A packet forwarded on the service chain first passes through the SF node 121, and then passes through the SF node 122. On the service chain, the service classifier 131 is connected to the SFE 111, and the SFE 111 is connected to the SF node 121 and the SF node 122. The detection device 141 may communicate with the service classifier 131, the SFE 111, the SF node 121, and the SF node 122. The detection device 141 sends a detection packet 1001 to each of the service classifier 131, the SFE 111, the SF node 121, and the SF node 122, to detect that the service classifier 131, the SFE 111, the SF node 121, and the SF node 122 all can normally work. In the network shown in FIG. 1, the service classifier 131 sends a service packet 1011 to the SFE 111. If a forwarding entry in the SFE 111 is abnormal, the SFE 111 first sends the received service packet 1011 to the SF node 122 according to the abnormal forwarding entry, and the SF node 122 performs service processing on the service packet 1011. Then, the SFE 111 sends, according to the abnormal forwarding entry, a service packet 1012 received from the SF node 122 to the SF node 121, and the SF node 121 performs service processing on the service packet 1012.

In a scenario shown in FIG. 1, although the service classifier 131, the SFE 111, the SF node 121, and the SF node 122 all can forward a service packet, abnormality of the forwarding entry in the SFE 111 causes a difference between an order of SF nodes that the service packet passes through on the service chain and the planned processing order. The detection device 141 cannot learn a problem that the order of the SF nodes that the service packet passes through on the service chain is wrong because of the abnormality of the forwarding entry in the SFE 111.

For the foregoing problem, a solution that is helpful to learn an SF node that a service chain passes through is put forward. The solution is as follows: An SFE obtains a first fault tracing detection request packet, then determines to communicate with a first SF node, and obtains an ID of the first SF node; and the SFE sends a first fault tracing detection response packet that includes a path ID and the ID of the first SF node to a device for initiating fault detection, so that the device for initiating fault detection learns information about an SF node that a service chain passes through. The solution may be implemented by using the following several embodiments.

The following describes reference numerals mentioned in the embodiments of the present invention: 131 may be used to identify a device for initiating fault detection; 111 and 112 may be used to identify an SFE; 121, 122, and 123 may be used to identify an SF node; 1021, 1022, 1023, 1024, 1025, 1026, 1042, 1043, and 1044 may be used to identify a fault tracing detection request packet; 1031, 1032, 1034, 1035, and 1036 may be used to identify a fault tracing detection response packet; and 1051 may be used to identify a connectivity detection packet.

Embodiment 1

Figure 2:
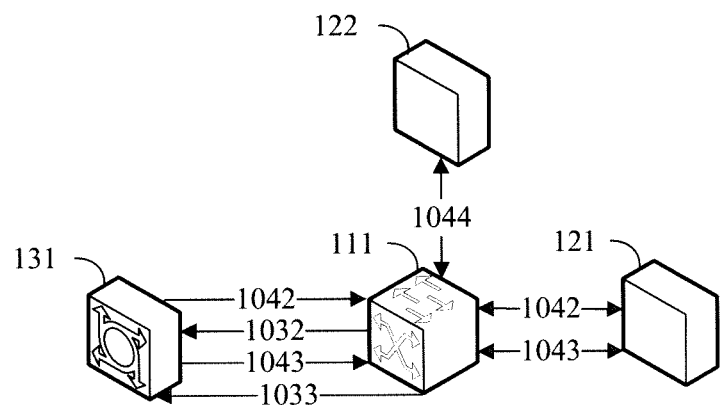
FIG. 2 is a schematic structural diagram of a network according to Embodiment 1 of the present invention.

FIG. 2 is a schematic structural diagram of a network according to Embodiment 1 of the present invention. The network shown in FIG. 2 may be used to provide a value-added service. In the network shown in FIG. 2, a service classifier 131 is connected to an SFE 111, and the SFE 111 is connected to each of an SF node 121 and an SF node 122. A service chain shown in FIG. 2 includes the service classifier 131, the SFE 111, the SF node 121, and the SF node 122. The service chain is a set of SF nodes, included in the service chain, that a packet passes through according to an order of the SF nodes. In the following embodiment of the present invention, a packet belonging to a particular type of service is referred to as a service packet. In a direction from the service classifier 131 to the SF node 122, the SFE 111 is a first SFE on the service chain, and the SF node 121 is a previous-hop SF node of the SF node 122 on the service chain.

Figure 3:
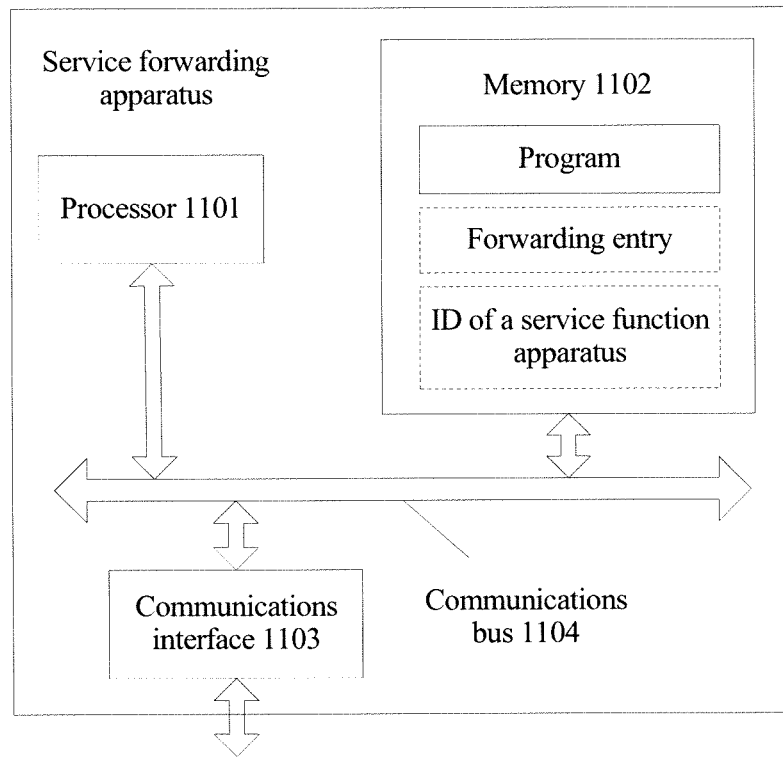
FIG. 3 is a schematic diagram of a service forwarding apparatus according to Embodiment 1 of the present invention.

FIG. 3 is a schematic diagram of a service forwarding apparatus according to Embodiment 1 of the present invention. The service forwarding apparatus shown in FIG. 3 may be any SFE in the structure of the network shown in FIG. 2. The service forwarding apparatus shown in FIG. 3 may be a switch, a router, or a server in a network. With reference to FIG. 2, an example in which the service forwarding apparatus shown in FIG. 3 is an SFE 111 is used in the following for description. The service forwarding apparatus shown in FIG. 3 includes: a processor 1101, a memory 1102, and a communications interface 1103. The processor 1101, the memory 1102, and the communications interface 1103 are connected by using a communications bus 1104. If the service forwarding apparatus shown in FIG. 3 is a switch in a network, the processor 1011 may be a network processor (NP). If the service forwarding apparatus shown in FIG. 3 is a router or a server, the processor 1011 may be a central processing unit (CPU).

The memory 1102 is configured to store a program. Optionally, the memory 1102 may further store an ID of a service function apparatus and a forwarding entry.

The processor 1101 performs the following operations according to an executable instruction included in the program that is read from the memory 1102:

The processor 1101 obtains a fault tracing detection request packet 1042 by using the communications interface 1103, and then determines to communicate with an SF node 121. The fault tracing detection request packet 1042 includes a path ID and an address of a device for initiating fault detection, and the path ID is used to identify a path of a service chain.

The processor 1101 obtains an ID of the SF node 121 from the memory 1102.

The processor 1101 sends a fault tracing detection response packet 1032 to a service classifier 131 by using the communications interface 1103. The fault tracing detection response packet 1032 includes the path ID, the ID of the SF node 121, and an address of the service classifier 131.

Optionally, the fault tracing detection request packet 1042 further includes a TTL field. After determining to communicate with the SF node 121, the processor 1101 obtains a TTL parameter, and when the TTL parameter reaches a preset value, sends the fault tracing detection response packet 1032 to the service classifier 131 by using the communications interface 1103. The TTL parameter is data obtained after a value of the TTL field in the fault tracing detection request packet 1042 is updated. The updating may be an operation of adding an offset to or subtracting an offset from a reference value. The value of the TTL field in the fault tracing detection request packet 1042 is used as the reference value. The reference value is greater than or equal to 0, the offset is greater than 0, and the preset value is greater than or equal to 0.

Figure 9:
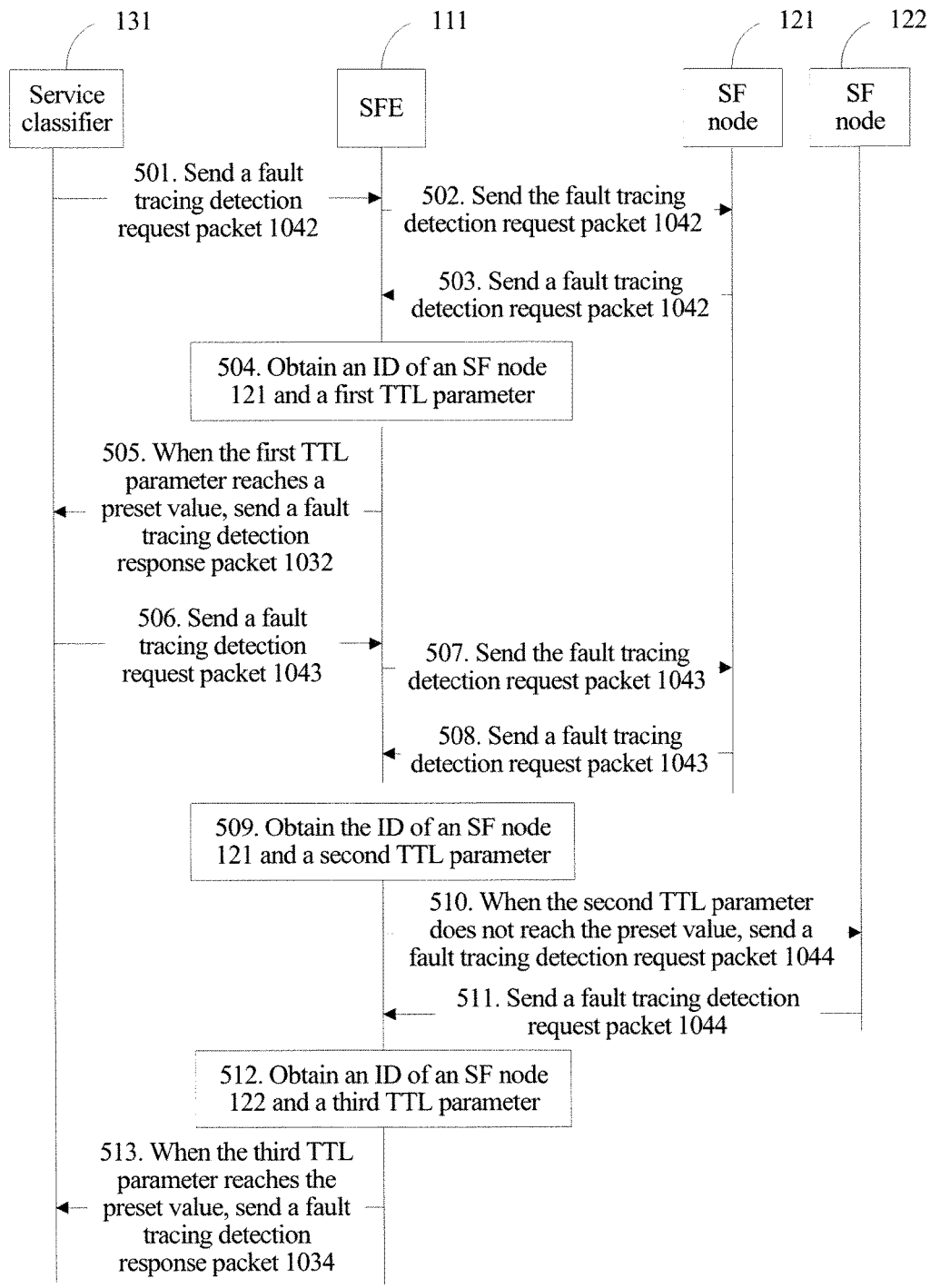
FIG. 9 is a flowchart of a service chain fault detection method according to Embodiment 1 of the present invention.

Further, the processor 1101 enables, according to the executable instruction and the forwarding entry in the memory 1102 by cooperating with the communications interface 1103, the service forwarding apparatus shown in FIG. 3 to perform all operations performed by an SFE 111 or an SFE 112 in the embodiment shown in FIG. 9. Alternatively, it may be considered that the service forwarding apparatus shown in FIG. 3 is the SFE 111 or the SFE 112 in the embodiment shown in FIG. 9.

Figure 4:
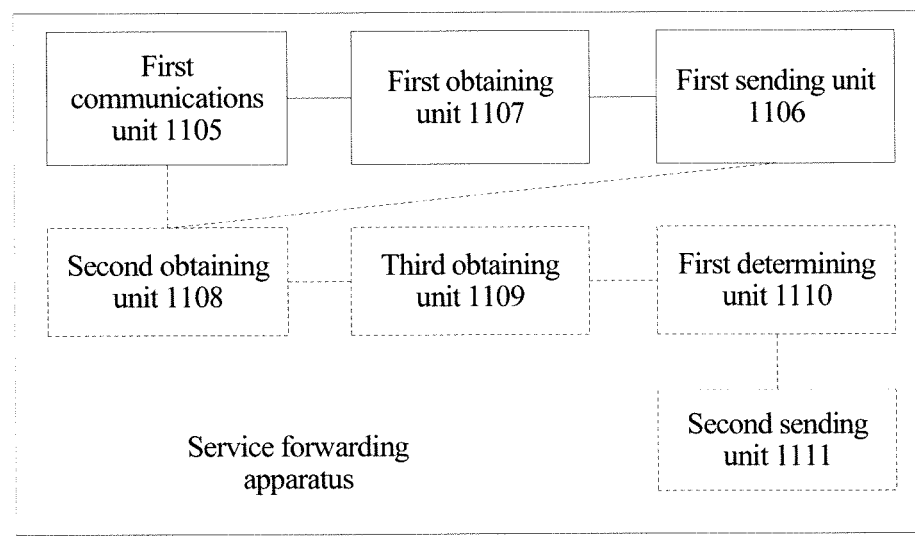
FIG. 4 is a schematic diagram of a service forwarding apparatus according to Embodiment 1 of the present invention.

FIG. 4 is a schematic diagram of a service forwarding apparatus according to Embodiment 1 of the present invention. The service forwarding apparatus shown in FIG. 4 includes: a first communications unit 1105, a first sending unit 1106, and a first obtaining unit 1107. Optionally, the service forwarding apparatus shown in FIG. 4 further includes a second obtaining unit 1108. Optionally, the service forwarding apparatus shown in FIG. 4 further includes: a third obtaining unit 1109, a first determining unit 1110, and a second sending unit 1111. Optionally, the service forwarding apparatus shown in FIG. 4 may further include a storage unit (not shown in FIG. 4). The storage unit may be configured to store a forwarding entry and an ID of an SF node connected to the service forwarding apparatus.

The service forwarding apparatus shown in FIG. 4 and the service forwarding apparatus shown in FIG. 3 may be a same apparatus. For example, both are the SFE 111 or the SFE 112 in the network shown in FIG. 2. It may be considered that from a physical perspective, FIG. 3 displays content included in a service forwarding apparatus, and from a logical perspective, FIG. 4 displays content included in a service forwarding apparatus. Optionally, a sending function included in the first communications unit 1105 in FIG. 4 may be implemented by the communications interface 1103 in FIG. 3. A forwarding entry determining function included in the first communications unit 1105 in FIG. 4 may be implemented by the processor 1101 in FIG. 3 according to an executable instruction stored in the memory 1102. In other words, the first communications unit 1105 in FIG. 4 may be implemented by a unit that implements the sending function and a unit that implements the forwarding entry determining function. The first sending unit 1106 and the second sending unit 1111 in FIG. 4 may be implemented by the communications interface 1103 in FIG. 3, and the communications interface 1103 may include at least one physical interface. The first obtaining unit 1107, the second obtaining unit 1108, the third obtaining unit 1109, and the first determining unit 1110 in FIG. 4 may be implemented by the processor 1101 in FIG. 3 according to the executable instruction stored in the memory 1102, and the processor 1101 may include at least one physical processor. The storage unit included in the service forwarding apparatus shown in FIG. 4 may be implemented by the memory 1102 in FIG. 3.

Figure 5:
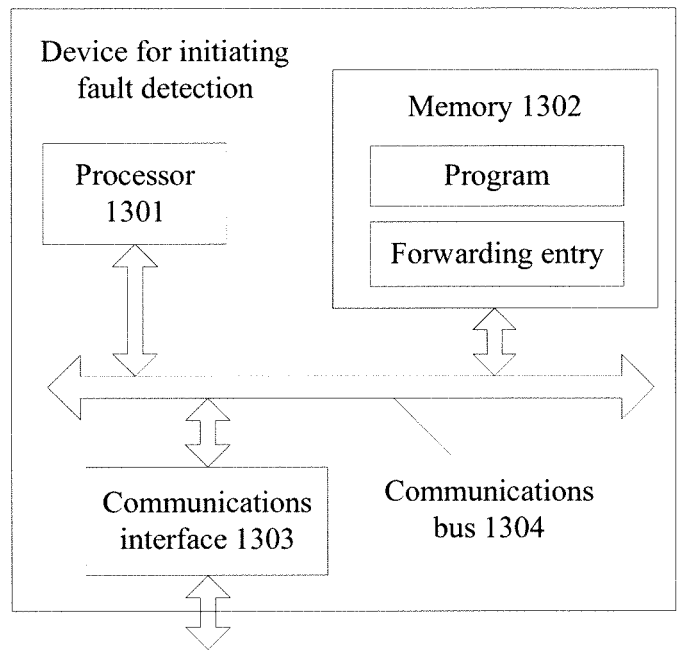
FIG. 5 is a schematic diagram of a device for initiating fault detection according to Embodiment 1 of the present invention.

FIG. 5 is a schematic diagram of a device for initiating fault detection according to Embodiment 1 of the present invention. The device for initiating fault detection shown in FIG. 5 may be the service classifier 131, the SFE 111, or the SFE 112 in the structure of the network shown in FIG. 2. With reference to FIG. 2, an example in which the device for initiating fault detection in FIG. 5 is the service classifier 131 is used in the following for description. The device for initiating fault detection shown in FIG. 5 includes: a processor 1301, a memory 1302, and a communications interface 1303. The processor 1301, the memory 1302, and the communications interface 1303 are connected by using a communications bus 1304. If the device for initiating fault detection shown in FIG. 5 is a switch in a network, the processor 1301 may be an NP. If the device for initiating fault detection shown in FIG. 5 is a router or a server, the processor 1301 may be a CPU.

The memory 1302 is configured to store a program and a forwarding entry.

The processor 1301 performs the following operations according to an executable instruction included in the program that is read from the memory 1302:

The processor 1301 sends a fault tracing detection request packet 1042 to an SFE 111 by using the communications interface 1303 according to the forwarding entry that is read from the memory 1302. The fault tracing detection request packet 1042 includes a path ID of a service chain and an address of the device for initiating fault detection. The forwarding entry includes the path ID and an address of the SFE 111. Optionally, the fault tracing detection request packet 1042 further includes a TTL field, and a value of the TTL field further included in the fault tracing detection request packet 1042 is in direct proportion to ranking of an SF node 121 on the service chain.

The processor 1301 receives a fault tracing detection response packet 1032 from the SFE 111 by using the communications interface 1303. The fault tracing detection response packet 1032 includes the path ID of the service chain, an ID of the SF node 121, and the address of the device for initiating fault detection. The processor 1301 may learn, according to the ID of the SF node 121 included in the fault tracing detection response packet 1032, that the service chain passes through the SF node 121 connected to the SFE 111.

Further, the processor 1301 enables, according to the executable instruction and the forwarding entry in the memory 1302 by cooperating with the communications interface 1303, the device for initiating fault detection shown in FIG. 5 to perform all operations performed by a service classifier 131 in the embodiment shown in FIG. 9. Alternatively, it may be considered that the device for initiating fault detection shown in FIG. 5 is the service classifier 131 in the embodiment shown in FIG. 9.

Figure 6:
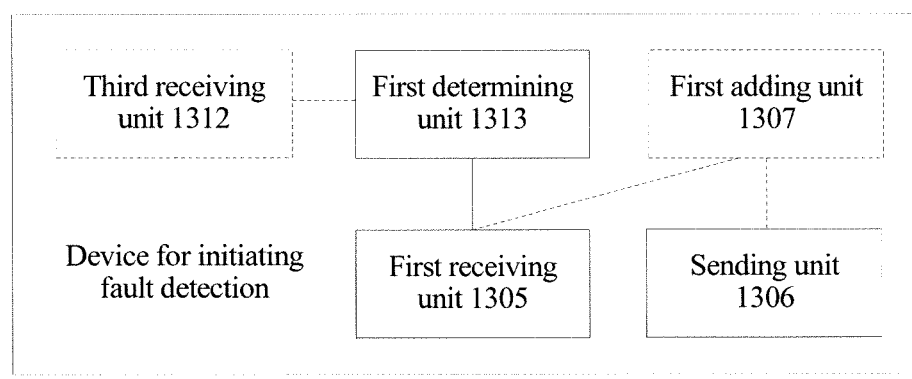
FIG. 6 is a schematic diagram of a device for initiating fault detection according to Embodiment 1 of the present invention.

FIG. 6 is a schematic diagram of a device for initiating fault detection according to Embodiment 1 of the present invention. The device for initiating fault detection shown in FIG. 6 includes: a sending unit 1306, a first receiving unit 1305, and a first determining unit 1313. Optionally, the device for initiating fault detection shown in FIG. 6 further includes: a first adding unit 1307 and a third receiving unit 1312. Optionally, the device for initiating fault detection shown in FIG. 6 may further include a storage unit (not shown in FIG. 6). The storage unit is configured to store a forwarding entry.

The device for initiating fault detection shown in FIG. 6 and the device for initiating fault detection shown in FIG. 5 may be a same apparatus. For example, both are the service classifier 131 in the network shown in FIG. 2. It may be considered that from a physical perspective, FIG. 5 displays content included in a device for initiating fault detection, and from a logical perspective, FIG. 6 displays content included in a device for initiating fault detection. Optionally, a sending function included in the sending unit 1306 in FIG. 6 may be implemented by the communications interface 1303 in FIG. 5. A forwarding entry determining function included in the sending unit 1306 in FIG. 6 may be implemented by the processor 1301 in FIG. 5 according to an executable instruction stored in the memory 1302. The first receiving unit 1305 and the third receiving unit 1312 in FIG. 6 may be implemented by the communications interface 1303 in FIG. 5, and the communications interface 1303 may include at least one physical interface. The first adding unit 1307 and the first determining unit 1313 in FIG. 6 may be implemented by the processor 1301 in FIG. 5 according to the executable instruction and a forwarding entry that are stored in the memory 1302, and the processor 1301 may include at least one physical processor. The storage unit included in the device for initiating fault detection shown in FIG. 6 may be implemented by the memory 1302 in FIG. 5.

Figure 7:
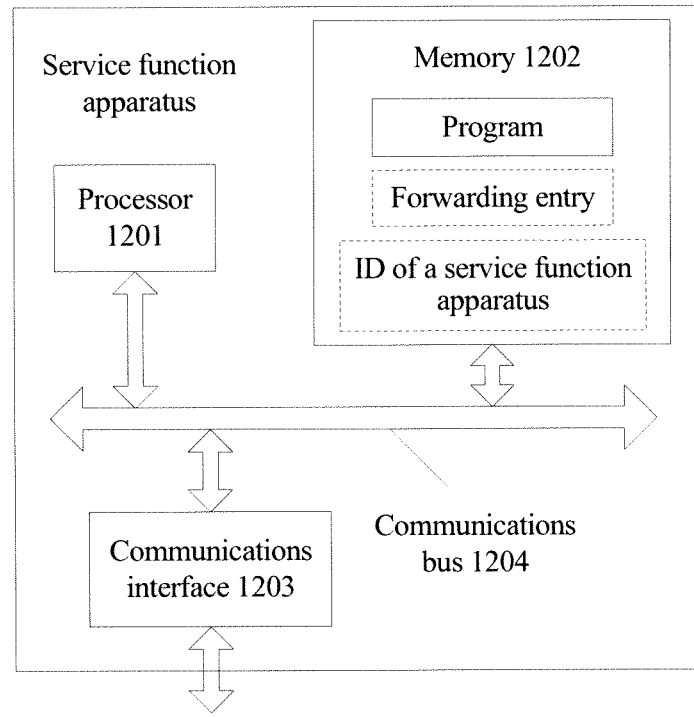
FIG. 7 is a schematic diagram of a service function apparatus according to Embodiment 1 of the present invention.

FIG. 7 is a schematic diagram of a service function apparatus according to Embodiment 1 of the present invention. The service function apparatus shown in FIG. 7 may be any SF node in the structure of the network shown in FIG. 2. With reference to FIG. 2, an example in which the service function apparatus shown in FIG. 7 is an SF node 121 is used in the following for description. The service function apparatus shown in FIG. 7 includes: a processor 1201, a memory 1202, and a communications interface 1203. The processor 1201, the memory 1202, and the communications interface 1203 are connected by using a communications bus 1204. If the service function apparatus shown in FIG. 7 is a switch in a network, the processor 1201 may be an NP. If the service function apparatus shown in FIG. 7 is a router or a server, the processor 1201 may be a CPU.

The memory 1202 is configured to store a program. Optionally, the memory 1202 may be further configured to store a forwarding entry and an ID of the service function apparatus. The ID of the service function apparatus includes an ID of the SF node 121.

The processor 1201 performs the following operations according to an executable instruction included in the program that is read from the memory 1202:

The processor 1201 receives a fault tracing detection request packet 1042 from an SFE 111 by using the communications interface 1203. The fault tracing detection request packet 1042 includes a path ID and an address of a device for initiating fault detection, and the path ID is used to identify a path of a service chain. Optionally, the fault tracing detection request packet 1042 further includes a TTL field.

The processor 1201 sends a fault tracing detection request packet 1042 to the SFE 111 by using the communications interface 1203.

Optionally, the processor 1201 may further read the ID of the SF node 121 from the memory 1202, for example, the ID of the SF node 121. The processor 1201 may add the ID of the SF node 121 to the fault tracing detection request packet 1042.

Further, the processor 1201 enables, according to the executable instruction in the memory 1202 by cooperating with the communications interface 1203, the service function apparatus in FIG. 7 to perform all operations performed by any SF node in the embodiment shown in FIG. 9. Alternatively, it may be considered that the service function apparatus shown in FIG. 7 is an SF node 121 or an SF node 122 in the embodiment shown in FIG. 9.

Figure 8:
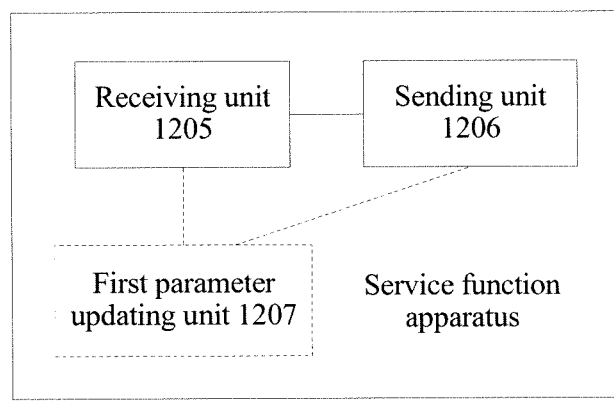
FIG. 8 is a schematic diagram of a service function apparatus according to Embodiment 1 of the present invention.

FIG. 8 is a schematic diagram of a service function apparatus according to Embodiment 1 of the present invention. The service function apparatus shown in FIG. 8 includes: a receiving unit 1205 and a sending unit 1206.

Optionally, the service function apparatus shown in FIG. 8 further includes a first parameter updating unit 1207. Optionally, the service function apparatus shown in FIG. 8 may further include a storage unit (not shown in FIG. 8). The storage unit is configured to store an ID of the service function apparatus. Optionally, the storage unit is further configured to store a forwarding entry.

The service function apparatus shown in FIG. 8 and the service forwarding apparatus shown in FIG. 7 may be a same apparatus. For example, both are the SF node 121 or the SF node 122 in the network shown in FIG. 2. It may be considered that from a physical perspective, FIG. 7 displays content included in a service function apparatus, and from a logical perspective, FIG. 8 displays content included in a service function apparatus. Optionally, the receiving unit 1205 and the sending unit 1206 in FIG. 8 may be implemented by the communications interface 1203 in FIG. 7, and the communications interface 1203 may include at least one physical interface. The first parameter updating unit 1207 in FIG. 8 may be implemented by the processor 1201 in FIG. 7 according to an executable instruction stored in the memory 1202, and the processor 1201 may include at least one physical processor. The storage unit included in the service function apparatus shown in FIG. 8 may be implemented by the memory 1202 in FIG. 7.

FIG. 9 is a flowchart of a service chain fault detection method according to Embodiment 1 of the present invention. If a device for initiating fault detection is a service classifier 131, and the service classifier 131 detects all SFEs included in a service chain and SF nodes connected to all the SFEs, the service classifier 131 may determine, according to a quantity of SF nodes on the service chain, a quantity of fault tracing detection request packets to be sent. Each fault tracing detection request packet sent by the service classifier 131 may be used to obtain an identifier of one SF node on the service chain. The service classifier 131 may determine, according to an order of sending a fault tracing detection request packet and the obtained ID of the SF node, a location of the SF node that is corresponding to the obtained ID of the SF node and is on the service chain. The network shown in FIG. 2 includes an SF node 121 and an SF node 122. With reference to the structure of the network shown in FIG. 2, the following describes in detail the service chain fault detection method provided in Embodiment 1.

501. A service classifier 131 sends a fault tracing detection request packet 1042 to an SFE 111.

For example, a sending unit 1306 in the service classifier 131 sends the fault tracing detection request packet 1042 to the SFE 111. Specifically, a forwarding entry stored in a storage unit in the service classifier 131 includes a path ID and an address of the SFE 111. The sending unit 1306 determines, according to the obtained path ID of the service chain, to forward the fault tracing detection request packet 1042 according to the forwarding entry in the storage unit. The sending unit 1306 sends the fault tracing detection request packet 1042 to the SFE 111 according to the address of the SFE 111.

For example, the path ID obtained by the sending unit 1306 may be from a detection instruction received by the service classifier 131. The fault tracing detection request packet 1042 sent by the sending unit 1306 may be a fault tracing detection request packet 1042 generated by the service classifier 131 according to the detection instruction. Optionally, the service classifier 131 further includes a unit configured to generate the fault tracing detection request packet 1042 according to the detection instruction. Alternatively, the fault tracing detection request packet 1042 sent by the sending unit 1306 may be a fault tracing detection request packet 1042 that is generated by another device and is received by the service classifier 131.

For example, a first adding unit 1307 may add a TTL field to the fault tracing detection request packet 1042, that is, the fault tracing detection request packet 1042 includes the TTL field, a first parameter, an address of the service classifier 131, and the path ID of the service chain. A value of the TTL field included in the fault tracing detection request packet 1042 may be used to identify a location of an SF node 121 on the service chain. That is, the value of the TTL field included in the fault tracing detection request packet 1042 is in direct proportion to ranking of the SF node 121 on the service chain. The first parameter is used to identify the SF node 121, a previous-hop SF node of the SF node 121 on the service chain, or a next-hop SF node of the SF node 121 on the service chain. If the SF node 121 is a first SF node on the service chain, the first parameter is a first preset ID, and the first preset ID indicates that the previous-hop SF node of the SF node 121 on the service chain does not exist. If the SF node 121 is a last SF node on the service chain, the first parameter is a second preset ID, and the second preset ID indicates that the next-hop SF node of the SF node 121 on the service chain does not exist. The first parameter may be an ID of an SF node identified by using the first parameter. An ID, mentioned in this embodiment of the present invention, of an SF node may be information such as a character, a string, a name, or an index (index), or may be an ID of a device to which the SF node belongs. An ID, mentioned in this embodiment of the present invention, of an SFE or a parameter, mentioned in this embodiment of the present invention, for identifying an SFE may be information such as a character, a digit, a string, a name, or an index, or may be an ID of a device to which the SFE belongs.

In the network shown in FIG. 2, the service classifier 131 is a device for initiating fault detection. Alternatively, a device for initiating fault detection may be the SFE 111 or another SFE connected to the SFE 111. As the device for initiating fault detection, the SFE 111 may implement all functions of the service classifier 131 in a service chain fault detection process. As the device for initiating fault detection, the another SFE may implement all the functions of the service classifier 131 in the service chain fault detection process.

502. The SFE 111 sends the fault tracing detection request packet 1042 to an SF node 121.

For example, a first communications unit 1105 in the SFE 111 obtains the fault tracing detection request packet 1042. A first forwarding entry stored in a storage unit in the SFE 111 includes the first parameter, the path ID, and an address of the SF node 121. The first communications unit 1105 may determine, according to the path ID and the first parameter that are included in the fault tracing detection request packet 1042, to forward the fault tracing detection request packet 1042 according to the first forwarding entry. The first communications unit 1105 sends the fault tracing detection request packet 1042 to the SF node 121 according to the address of the SF node 121.

For example, the first forwarding entry stored in the storage unit in the SFE 111 may include the path ID and the address of the SF node 121. The first communications unit 1105 may determine, according to the path ID included in the fault tracing detection request packet 1042, to forward the fault tracing detection request packet 1042 according to the first forwarding entry. Alternatively, the first forwarding entry stored in the storage unit in the SFE 111 may include the path ID, an identifier of an interface for connecting to the service classifier 131, and the address of the SF node 121. When an interface for receiving the fault tracing detection request packet 1042 is the interface for connecting to the service classifier 131, the first communications unit 1105 may determine, according to the path ID and the identifier of the interface for connecting to the service classifier 131, to forward the fault tracing detection request packet 1042 according to the first forwarding entry.

For example, the address of the SF node 121 may be an IP address of the SF node 121 or a MAC address of the SF node 121. If the SF node 121 and the SFE 111 are located on a same network device, the address of the SF node 121 may be an I/O address for connecting to the SF node 121 by the SFE 111. Alternatively, the address of the SF node 121 may be an identifier of an interface for connecting to the SF node 121 by the SFE 111.

503. The SF node 121 sends a fault tracing detection request packet 1042 to the SFE 111.

For example, a receiving unit 1205 in the SF node 121 receives the fault tracing detection request packet 1042 from the SFE 111. A sending unit 1206 in the SF node 121 sends the fault tracing detection request packet 1042 to the SFE 111.

For example, the sending unit 1206 may send the fault tracing detection request packet 1042 to the SFE 111 according to an interface through which the receiving unit 1205 receives the fault tracing detection request packet 1042. Alternatively, the sending unit 1206 may determine the address of the SFE 111 according to a forwarding entry stored in a storage unit in the SF node 121. The forwarding entry stored in the storage unit in the SF node 121 includes the path ID and the address of the SFE 111. The sending unit 1206 sends the fault tracing detection request packet 1042 to the SFE 111 according to the address of the SFE 111. The address of the SFE 111 may be an IP address of the SFE 111 or a MAC address of the SFE 111. If the SF node 121 and the SFE 111 are located on a same network device, the address of the SFE 111 may be an I/O address for connecting to the SFE 111 by the SF node 121. Alternatively, the address of the SFE 111 may be an identifier of an interface for connecting to the SFE 111 by the SF node 121.

For example, the SF node 121 has two working manners. One working manner is that the SF node 121 directly forwards the received fault tracing detection request packet 1042 to the SFE 111. The other working manner is that the SF node 121 adds an ID of the SF node 121 to the fault tracing detection request packet 1042 sent to the SFE 111. In the other working manner of the SF node 121, a first parameter updating unit 1207 included in the SF node 121 may add the ID of the SF node 121 to the fault tracing detection request packet 1042. In this embodiment, the sending unit 1206 sends, to the SFE 111, the fault tracing detection request packet 1042 to which the ID of the SF node 121 is added, so that the SFE 111 can obtain the ID of the SF node 121 from the fault tracing detection request packet 1042.

504. The SFE 111 obtains an ID of the SF node 121 and a first TTL parameter.

For example, a first obtaining unit 1107 in the SFE 111 obtains the ID of the SF node 121. The first obtaining unit 1107 may obtain the ID of the SF node 121 according to an interface for receiving the fault tracing detection request packet 1042 and a correspondence between the stored ID of the SF node 121 and the interface for receiving the fault tracing detection request packet 1042. Alternatively, the first obtaining unit 1107 may obtain the ID of the SF node 121 from the fault tracing detection request packet 1042. Alternatively, when the first parameter in the fault tracing detection request packet 1042 is used to identify the SF node 121, the first obtaining unit 1107 may use the obtained first parameter as the ID of the SF node 121.

For example, a second obtaining unit 1108 in the SFE 111 obtains the first TTL parameter. The first TTL parameter is data obtained after the value of the TTL field included in the fault tracing detection request packet 1042 from the service classifier 131 is updated. Specifically, after the first communications unit 1105 determines that the SFE 111 can communicate with the SF node 121, the second obtaining unit 1108 adds an offset to or subtracts an offset from a reference value to obtain the first TTL parameter, where the value of the TTL field included in the fault tracing detection request packet 1042 from the service classifier 131 is used as the reference value. Alternatively, the SF node 121 may update the value of the TTL field included in the fault tracing detection request packet 1042 from the SFE 111, to obtain the first TTL parameter. A value of a TTL field included in the fault tracing detection request packet 1042 sent by the SF node 121 to the SFE 111 is the first TTL parameter, and the second obtaining unit 1108 may obtain the first TTL parameter from the TTL field included in the fault tracing detection request packet 1042 from the SF node 121. For example, the value of the TTL field in the fault tracing detection request packet 1042 from the service classifier 131 is 2, the offset is 1, and the first TTL parameter obtained by the second obtaining unit 1108 may be 1.

505. When a value of the first TTL parameter reaches a preset value, the SFE 111 sends a fault tracing detection response packet 1032 to the service classifier 131.

For example, when the value of the first TTL parameter obtained by the second obtaining unit 1108 reaches the preset value, a first sending unit 1106 in the SFE 111 sends the fault tracing detection response packet 1032 to the service classifier 131. Specifically, the first sending unit 1106 may send the fault tracing detection response packet 1032 to the service classifier 131 according to the address of the service classifier 131 in the fault tracing detection request packet 1042. The preset value is greater than or equal to 0. For example, if the preset value is 1, the first TTL parameter obtained by the second obtaining unit 1108 reaches the preset value, and the first sending unit 1106 may send the fault tracing detection response packet 1032 to the service classifier 131.

For example, the fault tracing detection response packet 1032 in step 505 may be generated by the SFE 111 according to the path ID, the ID of the SF node 121, and the address of the service classifier 131. Alternatively, the fault tracing detection response packet 1032 in step 505 may be a fault tracing detection response packet that is generated by another device and is received by the SFE 111. Alternatively, a fault tracing detection response packet that is generated by another device and is received by the SFE 111 includes the path ID and the address of the service classifier 131, and the SFE 111 may add the ID of the SF node 121 to the fault tracing detection response packet, to obtain the fault tracing detection response packet 1032 in step 505. The another device is different from an SFE on the service chain.

For example, a first receiving unit 1305 in the service classifier 131 receives the fault tracing detection response packet 1032. A first determining unit 1313 in the service classifier 131 may determine, according to the ID of the SF node 121 in the fault tracing detection response packet 1032, that the service chain passes through the SF node 121 connected to the SFE 111, and forwarding between the SF node 121 and the SFE 111 is normal. That forwarding is normal mentioned in this embodiment of the present invention means that packet receiving and sending can be implemented between devices. The device is a device on which an SF node is located or a device on which an SFE is located.

Step 501 to step 505 are a procedure in which the service classifier 131 detects the SFE 111 and the SF node 121 connected to the SFE 111. If the service classifier 131 further needs to detect the SFE 111 and an SF node 122 connected to the SFE 111, a subsequent procedure including step 506 to step 513 may be executed. That is, step 506 to step 513 are optional content.

506. The service classifier 131 sends a fault tracing detection request packet 1043 to the SFE 111.

For example, a difference between the fault tracing detection request packet 1043 and the fault tracing detection request packet 1042 lies in that a value of a TTL field included in the fault tracing detection request packet 1043 identifies a location of the SF node 122 on the service chain. That is, the value of the TTL field included in the fault tracing detection request packet 1043 is in direct proportion to ranking of the SF node 122 on the service chain. For example, the value of the TTL field included in the fault tracing detection request packet 1043 is 3. Optionally, the first adding unit 1307 in the service classifier 131 may add the value of the TTL field to the fault tracing detection request packet 1043.

For example, after the first receiving unit 1305 in the service classifier 131 receives the fault tracing detection response packet 1032, the sending unit 1306 in the service classifier 131 may send the fault tracing detection request packet 1043 to the SFE 111. The fault tracing detection request packet 1043 may be generated by the service classifier 131 according to the fault tracing detection request packet 1042. Alternatively, the fault tracing detection request packet 1043 may be obtained by the service classifier 131 from another device.

A method for sending the fault tracing detection request packet 1043 by the service classifier 131 to the SFE 111 in step 506 is the same as a method for sending the fault tracing detection request packet 1042 by the service classifier 131 to the SFE 111 in step 501, and details are not described herein again.

507. The SFE 111 sends the fault tracing detection request packet 1043 to the SF node 121.

A method for sending the fault tracing detection request packet 1043 by the SFE 111 to the SF node 121 in step 507 is the same as a method for sending the fault tracing detection request packet 1042 by the SFE 111 to the SF node 121 in step 502, and details are not described herein again.

508. The SF node 121 sends a fault tracing detection request packet 1043 to the SFE 111.

A method for sending the fault tracing detection request packet 1043 by the SF node 121 to the SFE 111 in step 508 is the same as a method for sending the fault tracing detection request packet 1042 by the SF node 121 to the SFE 111 in step 503, and details are not described herein again.

509. The SFE 111 obtains the ID of the SF node 121 and a second TTL parameter.

A method for obtaining the ID of the SF node 121 by the SFE 111 in step 509 is the same as a method for obtaining the ID of the SF node 121 by the SFE 111 in step 504, a method for obtaining the second TTL parameter by the SFE 111 in step 509 is the same as a method for obtaining the first TTL parameter by the SFE 111 in step 504, and details are not described herein again.

For example, the value of the TTL field included in the fault tracing detection request packet 1043 from the service classifier 131 is 3. If a preset value is 1, the second TTL parameter obtained by the second obtaining unit 1108 in the SFE 111 is 2.

510. When a value of the second TTL parameter does not reach the preset value, the SFE 111 sends a fault tracing detection request packet 1044 to an SF node 122.

For example, when the second TTL parameter obtained by the second obtaining unit 1108 does not reach the preset value, a third obtaining unit 1109 in the SFE 111 obtains the fault tracing detection request packet 1044. The preset value is greater than or equal to 0. For example, the second TTL parameter obtained by the second obtaining unit 1108 is 2, and is greater than the preset value. The third obtaining unit 1109 in the SFE 111 obtains the fault tracing detection request packet 1044.

For example, a method for obtaining the fault tracing detection request packet 1044 by the third obtaining unit 1109 in the SFE 111 may be as follows: the third obtaining unit 1109 replaces the value of the TTL field in the fault tracing detection request packet 1043 with the second TTL parameter obtained by the second obtaining unit 1108. Alternatively, the third obtaining unit 1109 generates the fault tracing detection request packet 1044 according to the fault tracing detection request packet 1043 and the second TTL parameter obtained by the second obtaining unit 1108.

Optionally, if the fault tracing detection request packet 1043 further includes the first parameter, the third obtaining unit 1109 may further replace the first parameter in the fault tracing detection request packet 1043 with a second parameter, that is, the fault tracing detection request packet 1044 obtained by the third obtaining unit 1109 includes the second parameter. The second parameter is used to identify a next-hop SF node of an SF node, on the service chain, identified by using the first parameter.

For example, a second forwarding entry in the storage unit in the SFE 111 may include the second parameter, the path ID, and an address of a first device. The first device in this embodiment is the SF node 122. Alternatively, the first device mentioned in this embodiment of the present invention may be a next-hop SFE of the SFE 111 on the service chain. No further example is given herein for illustration. A first determining unit 1110 in the SFE 111 may determine, according to the second parameter and the path ID, to forward the fault tracing detection request packet 1044 according to the second forwarding entry. A second sending unit 1111 in the SFE 111 sends the fault tracing detection request packet 1044 to the SF node 122 according to an address of the SF node 122. Alternatively, a second forwarding entry in the storage unit in the SFE 111 may include the path ID, an identifier of an interface for connecting to the SF node 121, and an address of the SF node 122. After determining that the received fault tracing detection request packet 1043 is from the SF node 121, a first determining unit 1110 in the SFE 111 determines, according to the path ID and the identifier of the interface for connecting to the SF node 121, to forward the fault tracing detection request packet 1044 according to the second forwarding entry.

511. The SF node 122 sends a fault tracing detection request packet 1044 to the SFE 111.

A method for sending the fault tracing detection request packet 1044 by the SF node 122 to the SFE 111 in step 511 is the same as a method for sending the fault tracing detection request packet 1042 by the SF node 121 to the SFE 111 in step 503, and details are not described herein again. A value of a TTL field included in the fault tracing detection request packet 1044 sent by the SF node 122 to the SFE 111 is 2.

512. The SFE 111 obtains an ID of the SF node 122 and a third TTL parameter.

A method for obtaining the ID of the SF node 122 by the first obtaining unit 1107 in the SFE 111 is the same as a method for obtaining the ID of the SF node 121 by the first obtaining unit 1107 in step 504, and details are not described herein again.

For example, the second obtaining unit 1108 in the SFE 111 obtains the third TTL parameter according to the value of the TTL field included in the fault tracing detection request packet 1044. Specifically, after a first communications unit 1105 determines that the SFE 111 can communicate with the SF node 122, the second obtaining unit 1108 may add an offset to or subtract an offset from a reference value to obtain the third TTL parameter, where the value of the TTL field included in the fault tracing detection request packet 1044 is used as the reference value. Alternatively, the SF node 122 adds an offset to or subtracts an offset from a reference value to obtain the third TTL parameter, where a value of a TTL field included in the fault tracing detection request packet 1044 from the SFE 111 is used as the reference value. The SF node 122 adds the third TTL parameter to the TTL field in the fault tracing detection request packet 1044 sent to the SFE 111, so that the second obtaining unit 1108 obtains the third TTL parameter from the TTL field included in the fault tracing detection request packet 1044. For example, the value of the TTL field in the fault tracing detection request packet 1044 is 2, the offset is 1, and the third TTL parameter obtained by the second obtaining unit 1108 is 1.

513. When the third TTL parameter reaches the preset value, the SFE 111 sends a fault tracing detection response packet 1034 to the service classifier 131.

For example, when the third TTL parameter obtained by the second obtaining unit 1108 reaches the preset value, the first sending unit 1106 in the SFE 111 sends the fault tracing detection response packet 1034 to the service classifier 131. For example, the third TTL parameter obtained by the second obtaining unit 1108 is 1, and is the same as the preset value. The first sending unit 1106 may send the fault tracing detection response packet 1034 to the service classifier 131 according to the address of the service classifier 131.

For example, the fault tracing detection response packet 1034 may be generated by the SFE 111 according to the path ID, the ID of the SF node 122, and the address of the service classifier 131. Alternatively, the fault tracing detection response packet 1034 may be a fault tracing detection response packet that is generated by another device and is received by the SFE 111. Alternatively, a fault tracing detection response packet that is generated by another device and is received by the SFE 111 includes the path ID and the address of the service classifier 131, and the SFE 111 may add the ID of the SF node 122 to the fault tracing detection response packet, to obtain the fault tracing detection response packet 1034. Alternatively, the SFE 111 replaces the ID of the SF node 121 in the fault tracing detection response packet 1032 with the ID of the SF node 122, to obtain the fault tracing detection response packet 1034.

For example, a third receiving unit 1312 in the service classifier 131 receives the fault tracing detection response packet 1034. The first determining unit 1313 in the service classifier 131 may determine, according to the ID of the SF node 122 in the fault tracing detection response packet 1034, that the service chain passes through the SF node 122 connected to the SFE 111, and a link between the SF node 122 and the SFE 111 is normal. After the fault tracing detection response packet 1032 and the fault tracing detection response packet 1034 are received, the first determining unit 1313 may further determine that the SF node 122 on the service chain is located on a next hop of the SF node 121.

Optionally, an SF node on the service chain may further update a value of a TTL field in a received fault tracing detection request packet, so that an SFE connected to the SF node does not need to update the value of the TTL field in the fault tracing detection request packet.

Between step 502 and step 503, the following is further included: the first parameter updating unit 1207 in the SF node 121 obtains the first TTL parameter. A method for obtaining the first TTL parameter by the first parameter updating unit 1207 is the same as a method for obtaining the first TTL parameter by the second obtaining unit 1108 in the SFE 111 in step 504, and details are not described herein again. The first parameter updating unit 1207 in the SF node 121 adds the value of the first TTL parameter to the TTL field included in the fault tracing detection request packet 1042, so that the second obtaining unit 1108 in the SFE 111 can obtain the first TTL parameter from the TTL field included in the fault tracing detection request packet 1042.

Between step 507 and step 508, the following is further included: the first parameter updating unit 1207 in the SF node 121 obtains the second TTL parameter. A method for obtaining the second TTL parameter by the first parameter updating unit 1207 is the same as a method for obtaining the second TTL parameter by the second obtaining unit 1108 in the SFE 111 in step 509, and details are not described herein again. The first parameter updating unit 1207 in the SF node 121 adds the second TTL parameter to a TTL field included in the fault tracing detection request packet 1043, so that the second obtaining unit 1108 in the SFE 111 can obtain the second TTL parameter from the TTL field in the fault tracing detection request packet 1043.

Between step 510 and step 511, the following is further included: the first parameter updating unit 1207 in the SF node 122 obtains the third TTL parameter. A method for obtaining the third TTL parameter by the first parameter updating unit 1207 is the same as a method for obtaining the third TTL parameter by the second obtaining unit 1108 in the SFE 111 in step 512. The first parameter updating unit 1207 in the SF node 122 adds the third TTL parameter to the TTL field included in the fault tracing detection request packet 1044, so that the second obtaining unit 1108 in the SFE 111 can obtain the third TTL parameter from the TTL field in the fault tracing detection request packet 1044.

Embodiment 2

Figure 10:
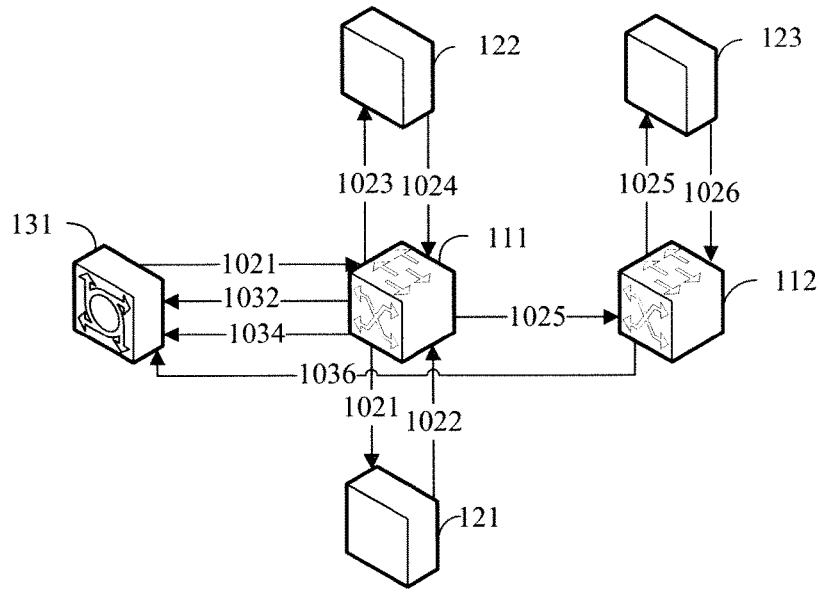
FIG. 10 is a schematic structural diagram of a network according to Embodiment 2 of the present invention.

FIG. 10 is a schematic structural diagram of a network according to Embodiment 2 of the present invention. The network shown in FIG. 10 may be used to provide a value-added service. In the network shown in FIG. 10, a service classifier 131 is connected to an SFE 111, the SFE 111 is connected to each of an SFE 112, an SF node 121, and an SF node 122, and the SFE 112 is connected to an SF node 123. A service chain shown in FIG. 10 includes the service classifier 131, the SFE 111, the SFE 112, the SF node 121, the SF node 122, and the SF node 123. The service chain is a set of SF nodes, included in the service chain, that a packet passes through according to an order of the SF nodes. In the following embodiment of the present invention, a packet belonging to a particular type of service is referred to as a service packet. In a direction from the service classifier 131 to the SF node 123, the SFE 111 is a previous-hop SFE of the SFE 112 on the service chain, the SF node 121 is a previous-hop SF node of the SF node 122 on the service chain, and the SF node 122 is a previous-hop SF node of the SF node 123 on the service chain.

A difference between any SFE in the network shown in FIG. 10 and an SFE in the network shown in FIG. 2 lies in that a fault tracing detection request packet 1021 sent by any SFE in the network shown in FIG. 10 is different from a fault tracing detection request packet 1042 sent by the SFE in the network shown in FIG. 2. In other words, any SFE in the network shown in FIG. 10 may include content included in the service forwarding apparatus shown in FIG. 3. That is, any SFE in the network shown in FIG. 10 includes: a processor 1101, a memory 1102, and a communications interface 1103. The processor 1101, the memory 1102, and the communications interface 1103 are connected by using a communications bus 1104. If the SFE shown in FIG. 10 is a switch in a network, the processor 1101 may be an NP. If the SFE shown in FIG. 10 is a router or a server, the processor 1011 may be a CPU.

The memory 1102 is configured to store a program. Optionally, the memory 1102 may further store an ID of a service function apparatus and a forwarding entry.

The processor 1101 performs the following operations according to an executable instruction included in the program that is read from the memory 1102:

The processor 1101 obtains a fault tracing detection request packet 1021 by using the communications interface 1103, and then determines to communicate with the SF node 121. The fault tracing detection request packet 1021 includes a path ID and an address of a device for initiating fault detection, and the path ID is used to identify a path of a service chain.

The processor 1101 obtains an ID of the SF node 121 from the memory 1102.

The processor 1101 sends a fault tracing detection response packet 1032 to the service classifier 131 by using the communications interface 1103. The fault tracing detection response packet 1032 includes the path ID, the ID of the SF node 121, and an address of the service classifier 131.

Figure 14:
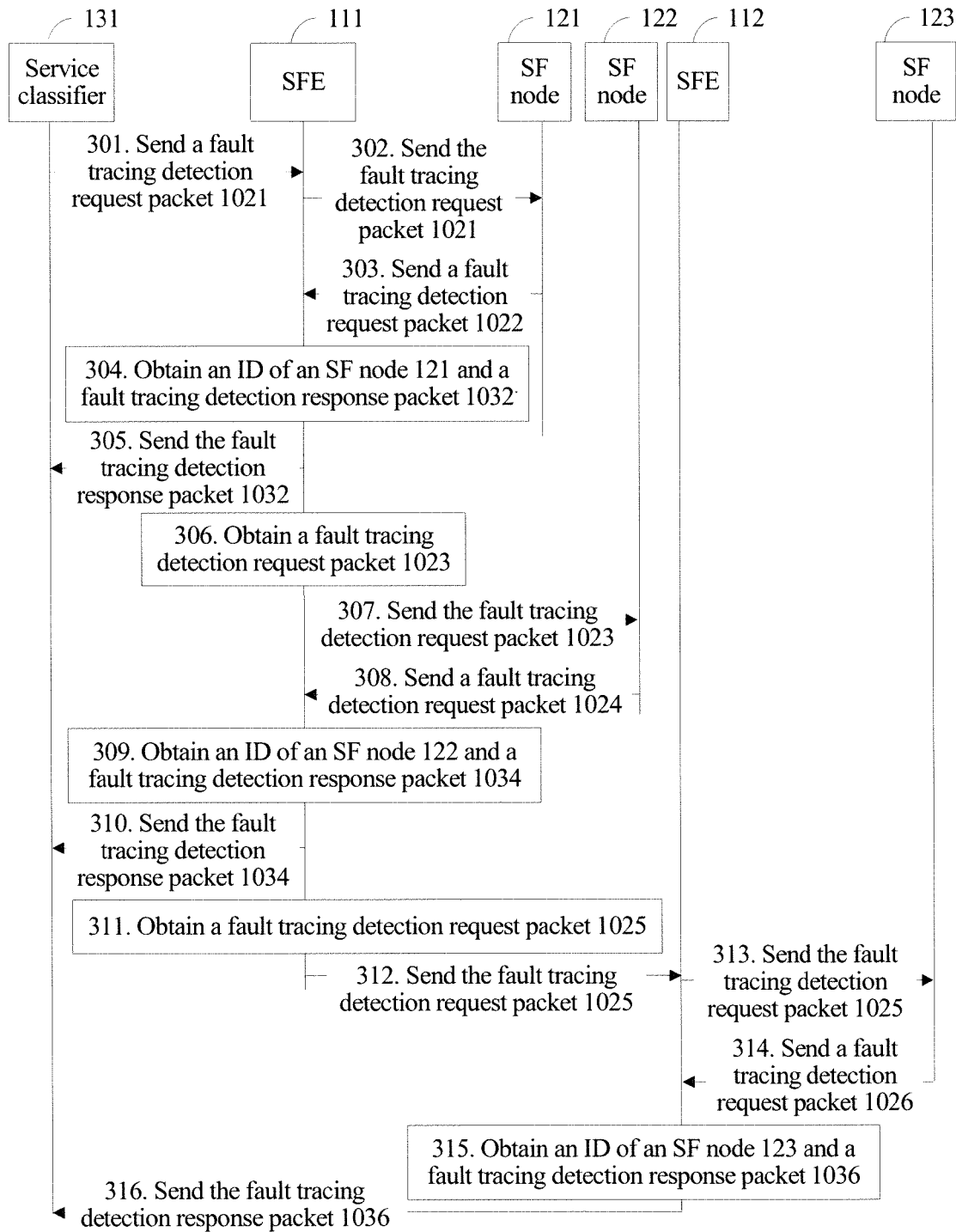
FIG. 14 is a flowchart of a service chain fault detection method according to Embodiment 2 of the present invention.

Further, the processor 1101 enables, according to the executable instruction and the forwarding entry in the memory 1102 by cooperating with the communications interface 1103, the SFE shown in FIG. 10 to perform all operations performed by an SFE 111 or an SFE 112 in the embodiment shown in FIG. 14.

Figure 11:
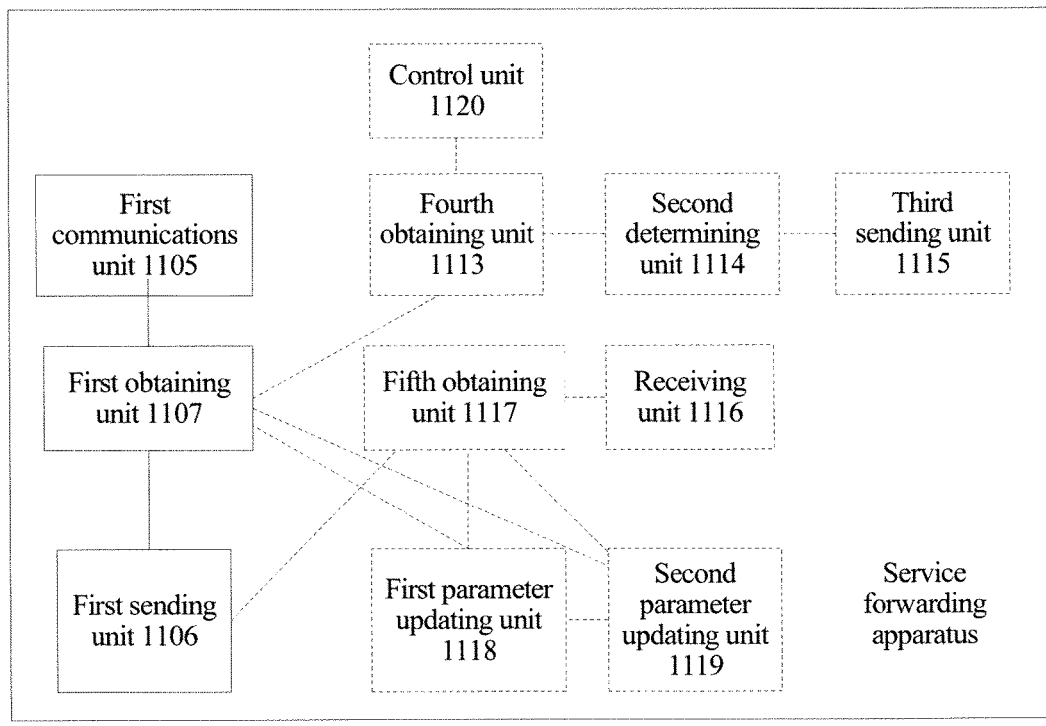
FIG. 11 is a schematic diagram of a service forwarding apparatus according to Embodiment 2 of the present invention.

FIG. 11 is a schematic diagram of a service forwarding apparatus according to Embodiment 2 of the present invention. The service forwarding apparatus shown in FIG. 11 includes: a first communications unit 1105, a first sending unit 1106, and a first obtaining unit 1107. Optionally, the service forwarding apparatus shown in FIG. 11 further includes: a fourth obtaining unit 1113, a second determining unit 1114, and a third sending unit 1115. Optionally, the service forwarding apparatus shown in FIG. 11 further includes: a receiving unit 1116 and a fifth obtaining unit 1117. Optionally, the service forwarding apparatus shown in FIG. 11 further includes: a first parameter updating unit 1118, a second parameter updating unit 1119, and/or a control unit 1120. Optionally, the service forwarding apparatus shown in FIG. 11 may further include a storage unit (not shown in FIG. 11). The storage unit is configured to store a forwarding entry and an ID of an SF node connected to an SFE 111. There is a correspondence between an identifier of an interface on the SFE 111 and the ID that is of the SF node connected to the SFE 111 and is stored in the storage unit.

The service forwarding apparatus shown in FIG. 11 and the service forwarding apparatus shown in FIG. 3 may be a same apparatus. For example, both are the SFE 111 or the SFE 112 in the network shown in FIG. 10. It may be considered that from a physical perspective, FIG. 3 displays content included in a service forwarding apparatus, and from a logical perspective, FIG. 11 displays content included in a service forwarding apparatus. Optionally, a sending function included in the first communications unit 1105 in FIG. 11 may be implemented by the communications interface 1103 in FIG. 3. A forwarding entry determining function included in the first communications unit 1105 in FIG. 11 may be implemented by the processor 1101 in FIG. 3 according to an executable instruction stored in the memory 1102. The first sending unit 1106, the third sending unit 1115, and the receiving unit 1116 in FIG. 11 may be implemented by the communications interface 1103 in FIG. 3, and the communications interface 1103 may include at least one physical interface. The first obtaining unit 1107, the fourth obtaining unit 1113, the second determining unit 1114, the fifth obtaining unit 1117, the first parameter updating unit 1118, the second parameter updating unit 1119, and the control unit 1120 in FIG. 11 may be implemented by the processor 1101 in FIG. 3 according to the executable instruction stored in the memory 1102, and the processor 1101 may include at least one physical processor. The storage unit included in the service forwarding apparatus shown in FIG. 11 may be implemented by the memory 1102 in FIG. 3.

A difference between the service classifier 131 in the network shown in FIG. 10 and the service classifier 131 in the network shown in FIG. 2 lies in that the service classifier 131 in the network shown in FIG. 10 may send a fault tracing detection request packet 1021 to detect a service chain. That is, a manner in which the service classifier 131 in the network shown in FIG. 10 sends a fault tracing detection request packet is different from that of the service classifier 131 in the network shown in FIG. 2. In other words, the service classifier 131 in the network shown in FIG. 10 may include content included in the device for initiating fault detection shown in FIG. 5. That is, the service classifier 131 in the network shown in FIG. 10 includes: a processor 1301, a memory 1302, and a communications interface 1303. The processor 1301, the memory 1302, and the communications interface 1303 are connected by using a communications bus 1304. If the service classifier 131 shown in FIG. 10 is a switch in a network, the processor 1301 may be an NP. If the service classifier 131 shown in FIG. 10 is a router or a server, the processor 1301 may be a CPU.

The memory 1302 is configured to store a program and a forwarding entry.

The processor 1301 performs the following operations according to an executable instruction included in the program that is read from the memory 1302:

The processor 1301 sends a fault tracing detection request packet 1021 to the SFE 111 according to the forwarding entry that is read from the memory 1302 and by using the communications interface 1303. The fault tracing detection request packet 1021 includes a path ID of a service chain and an address of a device for initiating fault detection. The forwarding entry includes the path ID and an address of the SFE 111.

The processor 1301 receives a fault tracing detection response packet 1032 from the SFE 111 by using communications interface 1303. The fault tracing detection response packet 1032 includes the path ID of the service chain, an ID of the SF node 121, and the address of the device for initiating fault detection. The processor 1301 may learn, according to the ID of the SF node 121 included in the fault tracing detection response packet 1032, that the service chain passes through the SF node 121 connected to the SFE 111.

Further, the processor 1301 enables, according to the executable instruction and the forwarding entry in the memory 1302 by cooperating with the communications interface 1303, the service classifier 131 shown in FIG. 10 to perform all operations performed by a service classifier 131 in the embodiment shown in FIG. 14.

Figure 12:
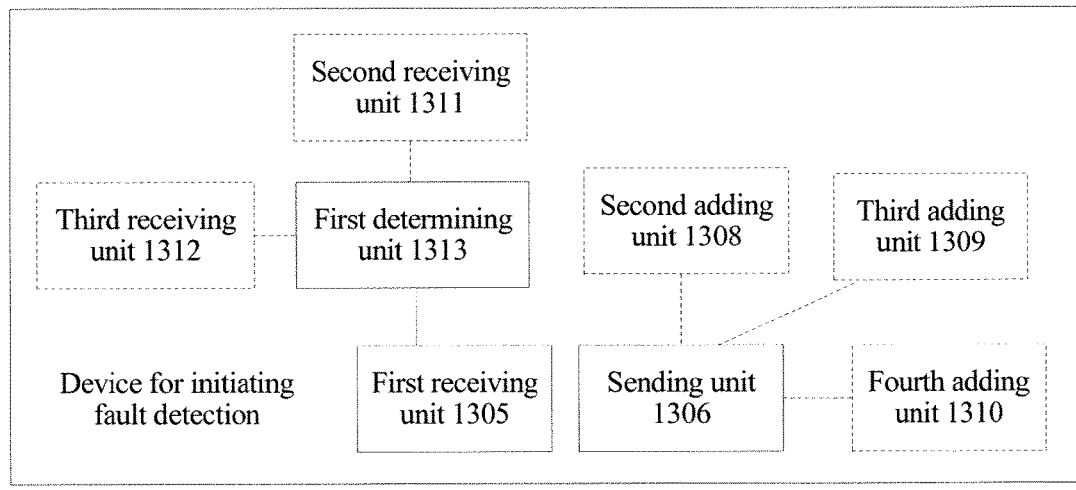
FIG. 12 is a schematic diagram of a device for initiating fault detection according to Embodiment 2 of the present invention.

FIG. 12 is a schematic diagram of a device for initiating fault detection according to Embodiment 2 of the present invention. The device for initiating fault detection shown in FIG. 12 includes: a sending unit 1306, a first receiving unit 1305, and a first determining unit 1313. Optionally, the device for initiating fault detection shown in FIG. 12 further includes: a second adding unit 1308, a third adding unit 1309, a fourth adding unit 1310, a second receiving unit 1311, and/or a third receiving unit 1312. Optionally, the device for initiating fault detection shown in FIG. 12 may further include a storage unit (not shown in FIG. 12). The storage unit is configured to store a forwarding entry.

The device for initiating fault detection shown in FIG. 12 and the device for initiating fault detection shown in FIG. 5 may be a same apparatus. For example, both are the service classifier 131 in the network shown in FIG. 10. It may be considered that from a physical perspective, FIG. 5 displays content included in a device for initiating fault detection, and from a logical perspective, FIG. 12 displays content included in a device for initiating fault detection. Optionally, a sending function included in the sending unit 1306 in FIG. 12 may be implemented by the communications interface 1303 in FIG. 5. A forwarding entry determining function included in the sending unit 1306 in FIG. 12 may be implemented by the processor 1301 in FIG. 5 according to an executable instruction stored in the memory 1302. The first receiving unit 1305, the second receiving unit 1311, and the third receiving unit 1312 in FIG. 12 may be implemented by the communications interface 1303 in FIG. 5, and the communications interface 1303 may include at least one physical interface. The second adding unit 1308, the third adding unit 1309, the fourth adding unit 1310, and the first determining unit 1313 in FIG. 12 may be implemented by the processor 1301 in FIG. 5 according to the executable instruction and a forwarding entry that are stored in the memory 1302, and the processor 1301 may include at least one physical processor. The storage unit included in the device for initiating fault detection shown in FIG. 12 may be implemented by the memory 1302 in FIG. 5.

A difference between any SF node in the network shown in FIG. 10 and an SF node in the network shown in FIG. 2 lies in that a fault tracing detection request packet received and sent by any SF node in the network shown in FIG. 10 is different from a fault tracing detection request packet sent by the SF node in the network shown in FIG. 2. In other words, any SF node in the network shown in FIG. 10 may include content included in the service function apparatus shown in FIG. 7. That is, any SF node in the network shown in FIG. 10 includes: a processor 1201, a memory 1202, and a communications interface 1203. The processor 1201, the memory 1202, and the communications interface 1203 are connected by using a communications bus 1204. If the SF node shown in FIG. 10 is a switch in a network, the processor 1201 may be an NP. If the SF node shown in FIG. 10 is a router or a server, the processor 1201 may be a CPU.

The memory 1202 is configured to store a program and an ID of the SF node. Optionally, the memory 1202 may be further configured to store a forwarding entry.

The processor 1201 performs the following operations according to an executable instruction included in the program that is read from the memory 1202:

The processor 1201 receives a fault tracing detection request packet 1021 from the SFE 111 by using the communications interface 1203. The fault tracing detection request packet 1021 includes a path ID and an address of a device for initiating fault detection, and the path ID is used to identify a path of a service chain.

The processor 1201 sends a fault tracing detection request packet 1022 to the SFE 111 by using the communications interface 1203. The fault tracing detection request packet 1022 includes the path ID and the address of the device for initiating fault detection.

Optionally, the processor 1201 may further read the ID of the SF node from the memory 1202, for example, an ID of the SF node 121. The processor 1201 may add the ID of the SF node 121 to the fault tracing detection request packet 1022.

Further, the processor 1201 enables, according to the executable instruction in the memory 1202 by cooperating with the communications interface 1203, the SF node shown in FIG. 10 to perform all operations performed by any SF node in the embodiment shown in FIG. 14.

Figure 13:
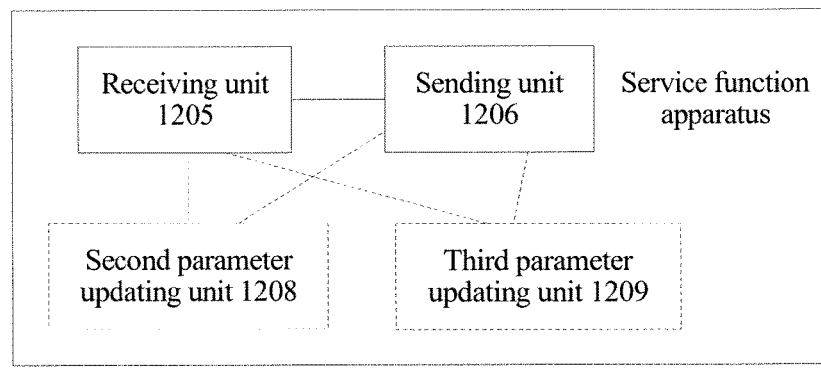
FIG. 13 is a schematic diagram of a service function apparatus according to Embodiment 2 of the present invention.

FIG. 13 is a schematic diagram of a service function apparatus according to Embodiment 2 of the present invention. The service function apparatus shown in FIG. 13 includes: a receiving unit 1205 and a sending unit 1206. Optionally, the service function apparatus shown in FIG. 13 further includes: a second parameter updating unit 1208 and a third parameter updating unit 1209. Optionally, the service function apparatus shown in FIG. 13 may further include a storage unit (not shown in FIG. 13). The storage unit is configured to store an ID of the service function apparatus. Optionally, the storage unit is further configured to store a forwarding entry.

The service function apparatus shown in FIG. 13 and the service forwarding apparatus shown in FIG. 7 may be a same apparatus. For example, both are the SF node 121 or the SF node 122 in the network shown in FIG. 10. It may be considered that from a physical perspective, FIG. 7 displays content included in a service function apparatus, and from a logical perspective, FIG. 13 displays content included in a service function apparatus. Optionally, the receiving unit 1205 and the sending unit 1206 in FIG. 13 may be implemented by the communications interface 1203 in FIG. 7, and the communications interface 1203 may include at least one physical interface. The second parameter updating unit 1208 and the third parameter updating unit 1209 in FIG. 13 may be implemented by the processor 1201 in FIG. 7 according to an executable instruction stored in the memory 1202, and the processor 1201 may include at least one physical processor. The storage unit included in the service function apparatus shown in FIG. 13 may be implemented by the memory 1202 in FIG. 7.

FIG. 14 is a flowchart of a service chain fault detection method according to Embodiment 2 of the present invention. With reference to FIG. 10 to FIG. 13, the following describes in detail the service chain fault detection method provided in Embodiment 2.

301. A service classifier 131 sends a fault tracing detection request packet 1021 to an SFE 111.

For example, a sending unit 1306 in the service classifier 131 sends the fault tracing detection request packet 1021 to the SFE 111. The fault tracing detection request packet 1021 includes an address of the service classifier 131 and a path ID of a service chain. Specifically, a forwarding entry stored in a storage unit in the service classifier 131 includes the path ID and an address of the SFE 111. The sending unit 1306 determines, according to the obtained path ID of the service chain, to forward the fault tracing detection request packet 1021 according to the forwarding entry in the storage unit in the service classifier 131. The sending unit 1306 sends the fault tracing detection request packet 1021 to the SFE 111 according to the address of the SFE 111.

For example, the path ID obtained by the sending unit 1306 may be from a detection instruction received by the service classifier 131. The fault tracing detection request packet 1021 sent by the sending unit 1306 may be a fault tracing detection request packet 1021 generated according to the detection instruction. Alternatively, the fault tracing detection request packet 1021 sent by the sending unit 1306 may be a received fault tracing detection request packet 1021 generated by another device.

Optionally, the fault tracing detection request packet 1021 further includes a first parameter. The first parameter in Embodiment 2 and the first parameter in step 501 in Embodiment 1 are the same in definition, and details are not described herein again.

In the network shown in FIG. 10, the service classifier 131 is a device for initiating fault detection that receives the detection instruction. If the device for initiating fault detection is the SFE 111 itself or another SFE connected to the SFE 111, the SFE 111 itself or the another SFE (an SFE except the SFE 112) connected to the SFE 111 may implement all operations of the service classifier 131 in a service chain fault detection process. For example, if the another SFE (an SFE except the SFE 112) connected to the SFE 111 is the device for initiating fault detection, the another SFE (an SFE except the SFE 112) connected to the SFE 111 may generate the fault tracing detection request packet 1021 according to the received detection instruction. If the SFE 111 is the device for initiating fault detection, the SFE 111 may generate the fault tracing detection request packet 1021 according to the received detection instruction.

302. The SFE 111 sends the fault tracing detection request packet 1021 to an SF node 121.

A method for sending the fault tracing detection request packet 1021 by the SFE 111 to the SF node 121 in step 302 is the same as a method for sending the fault tracing detection request packet 1042 by the SFE 111 to the SF node 121 in step 502 in Embodiment 1, and details are not described herein again.

303. The SF node 121 sends a fault tracing detection request packet 1022 to the SFE 111.

For example, a receiving unit 1205 in the SF node 121 is configured to receive the fault tracing detection request packet 1021 from the SFE 111. A sending unit 1206 in the SF node 121 is configured to send the fault tracing detection request packet 1022 to the SFE 111. The fault tracing detection request packet 1022 includes the path ID and the address of the service classifier 131. Alternatively, in addition to the path ID and the address of the service classifier 131, the fault tracing detection request packet 1022 includes at least one of the first parameter or an ID of the SF node 121.

For example, the sending unit 1206 may send the fault tracing detection request packet 1022 to the SFE 111 according to an interface through which the receiving unit 1205 receives the fault tracing detection request packet 1021. Alternatively, the sending unit 1206 may determine the address of the SFE 111 according to a forwarding entry stored in a storage unit in the SF node 121. The forwarding entry stored in the storage unit in the SF node 121 includes the path ID and the address of the SFE 111. The sending unit 1206 sends the fault tracing detection request packet 1022 to the SFE 111 according to the address of the SFE 111. The address of the SFE 111 may be an IP address of the SFE 111 or a MAC address of the SFE 111. If the SF node 121 and the SFE 111 are located on a same network device, the address of the SFE 111 may be an I/O address for connecting to the SF node 121. Alternatively, the address of the SFE 111 may be an identifier of an interface for connecting to the SFE 111 by the SF node 121.

For example, the SF node 121 has two working manners. One working manner is that the SF node 121 uses the received fault tracing detection request packet 1021 as the fault tracing detection request packet 1022, and sends the fault tracing detection request packet 1022 to the SFE 111. The other working manner is that the SF node 121 obtains the fault tracing detection request packet 1022 according to the ID of the SF node 121 and the fault tracing detection request packet 1021. Specifically, in the other working manner of the SF node 121, a second parameter updating unit 1208 in the SF node 121 may add the ID of the SF node 121 to the fault tracing detection request packet 1021, to obtain the fault tracing detection request packet 1022. Alternatively, a second parameter updating unit 1208 replaces the first parameter in the fault tracing detection request packet 1021 with the ID of the SF node 121, to obtain the fault tracing detection request packet 1022. Alternatively, a second parameter updating unit 1208 generates, according to the ID of the SF node 121 and the fault tracing detection request packet 1021, the fault tracing detection request packet 1022 that includes the ID of the SF node 121.

304. The SFE 111 obtains an ID of the SF node 121 and a fault tracing detection response packet 1032.

For example, a first communications unit 1105 in the SFE 111 receives the fault tracing detection request packet 1022 from the SF node 121. A first obtaining unit 1107 is configured to obtain the ID of the SF node 121. The first obtaining unit 1107 may obtain the ID of the SF node 121 according to an interface for receiving the fault tracing detection request packet 1022 and a correspondence between the ID of the SF node 121 stored in the storage unit in the SFE ill and the interface for receiving the fault tracing detection request packet 1022. Alternatively, the first obtaining unit 1107 may obtain the ID of the SF node 121 from the fault tracing detection request packet 1022. Alternatively, when the first parameter in the fault tracing detection request packet 1022 is used to identify the SF node 121, the first obtaining unit 1107 may use the first parameter as the ID of the SF node 121, to obtain the ID of the SF node 121.

For example, the first obtaining unit 1107 in the SFE 111 may generate the fault tracing detection response packet 1032 according to the path ID, the obtained ID of the SF node 121, and the address of the service classifier 131. Alternatively, the first obtaining unit 1107 in the SFE 111 may add the obtained ID of the SF node 121 to a received fault tracing detection response packet generated by another device, to obtain the fault tracing detection response packet 1032.

Optionally, the first obtaining unit 1107 in the SFE 111 may further add the first parameter, an ID of the SFE 111, and/or an ID of an SF node 122 to the fault tracing detection response packet 1032, which helps the service classifier 131 to learn a location of the SF node 121 on the service chain. The ID of the SFE 111 and the ID of the SF node 122 may be stored in the storage unit in the SFE 111. The first obtaining unit 1107 may obtain the ID of the SF node 122 according to a correspondence between the ID of the SF node 122 in the storage unit and the path ID.

305. The SFE 111 sends the fault tracing detection response packet 1032 to the service classifier 131.

For example, a first sending unit 1106 in the SFE 111 sends the fault tracing detection response packet 1032 to the service classifier 131 according to the address of the service classifier 131 in the fault tracing detection request packet 1022. The first sending unit 1106 is configured to send the fault tracing detection response packet 1032 to the service classifier 131 in a manner of sending the fault tracing detection response packet 1032 by using a reverse service chain of the service chain or by using a unicast IP packet.

For example, that the first sending unit 1106 sends the fault tracing detection response packet 1032 by using the reverse service chain of the service chain includes: the storage unit in the SFE 111 may be configured to store a correspondence between the path ID of the service chain and a path ID of the reverse service chain. The reverse service chain and the service chain are opposite in direction. The reverse service chain and the service chain may pass through a same link or different links. The first sending unit 1106 in the SFE 111 may send the fault tracing detection response packet 1032 to the service classifier 131 according to a forwarding entry corresponding to the reverse service chain of the service chain. The forwarding entry corresponding to the reverse service chain of the service chain may be stored in the storage unit in the SFE 111.

For example, the unicast IP packet may be an Internet Control Message Protocol (ICMP) packet or a User Datagram Protocol (UDP) packet. In an example of the ICMP packet, a destination address in the ICMP packet is the address of the service classifier 131. A packet header of the ICMP packet includes a type parameter, and the type parameter is used to identify that a type of the ICMP packet belongs to a fault tracing detection response packet. Content in the ICMP packet includes the path ID of the service chain and the ID of the SF node 121. In an example of the UDP packet, a destination address in the UDP packet is the address of the service classifier 131. A port number included in a packet header of the UDP packet is used to identify that a type of the UDP packet belongs to a fault tracing detection response packet. Content in the UDP packet includes the path ID of the service chain and the ID of the SF node 121.

For example, a first receiving unit 1305 in the service classifier 131 receives the fault tracing detection response packet 1032. A first determining unit 1313 in the service classifier 131 may determine, according to the ID of the SF node 121 in the fault tracing detection response packet 1032, that the service chain passes through the SF node 121 connected to the SFE 111, and a link between the SF node 121 and the SFE 111 is normal.

306. The SFE 111 obtains a fault tracing detection request packet 1023.

For example, a fourth obtaining unit 1113 in the SFE 111 is configured to obtain the fault tracing detection request packet 1023. The fault tracing detection request packet 1023 includes a second parameter, the path ID of the service chain, and the address of the service classifier 131. An SF node identified by using the second parameter is a next-hop SF node of an SF node, on the service chain, identified by using the first parameter. When the first parameter is the ID of the SF node 121, the second parameter is the ID of the SF node 122. When the first parameter is an ID of a previous-hop SF node of the SF node 121 on the service chain, the second parameter is the ID of the SF node 121. The ID of the previous-hop SF node of the SF node 121 on the service chain may be a preset ID, and is used to indicate that the previous-hop SF node of the SF node 121 on the service chain does not exist.

For example, a method for obtaining the fault tracing detection request packet 1023 by the fourth obtaining unit 1113 in the SFE 111 includes: when the second parameter is the same as the ID of the SF node 121, the fourth obtaining unit 1113 in the SFE 111 may use the fault tracing detection request packet 1022 as the fault tracing detection request packet 1023. Alternatively, the fault tracing detection request packet 1022 includes the first parameter, and the fourth obtaining unit 1113 in the SFE 111 replaces the first parameter in the fault tracing detection request packet 1022 with the second parameter, to obtain the fault tracing detection request packet 1023. Alternatively, the fourth obtaining unit 1113 in the SFE 111 is configured to generate the fault tracing detection request packet 1023 according to the obtained second parameter, the path ID, and the address of the service classifier 131.

For example, the storage unit in the SFE 111 stores a correspondence between the ID of the SF node 122 and the interface for receiving the fault tracing detection request packet 1022. The fourth obtaining unit 1113 in the SFE 111 obtains the second parameter according to the interface for receiving the fault tracing detection request packet 1022 and an ID that is of an SF node and is corresponding to the interface for receiving the fault tracing detection request packet 1022.

307. The SFE 111 sends the fault tracing detection request packet 1023 to an SF node 122.

For example, a second forwarding entry stored in the storage unit in the SFE 111 includes the path ID, the second parameter, and an address of a first device. In step 307, the address of the first device is an address of the SF node 122. A second determining unit 1114 in the SFE 111 determines, according to the second parameter and the path ID, to forward the fault tracing detection request packet 1023 according to the second forwarding entry. A third sending unit 1115 in the SFE 111 sends the fault tracing detection request packet 1023 to the SF node 122 according to the address of the SF node 122. Alternatively, a second forwarding entry stored in the storage unit in the SFE 111 includes the path ID, an identifier of the interface for receiving the fault tracing detection request packet 1022, and an address of a first device. In step 307, the address of the first device is an address of the SF node 122. A second determining unit 1114 in the SFE 111 may determine, according to the path ID and the identifier of the interface for receiving the fault tracing detection request packet 1022, to forward the fault tracing detection request packet 1023 according to the second forwarding entry.

308. The SF node 122 sends a fault tracing detection request packet 1024 to the SFE 111.

For example, a receiving unit 1205 in the SF node 122 is configured to receive the fault tracing detection request packet 1023 from the SFE 111. A sending unit 1206 in the SF node 122 is configured to send the fault tracing detection request packet 1024 to the SFE 111. In addition to the path ID and the address of the service classifier 131, the fault tracing detection request packet 1024 includes at least one of the second parameter or the ID of the SF node 122.

For example, the sending unit 1206 may send the fault tracing detection request packet 1024 to the SFE 111 according to an interface through which the receiving unit 1205 receives the fault tracing detection request packet 1023.

Alternatively, the sending unit 1206 may determine the address of the SFE 111 according to a forwarding entry stored in a storage unit in the SF node 122. The forwarding entry stored in the storage unit in the SF node 122 includes the path ID and the address of the SFE 111. The sending unit 1206 sends the fault tracing detection request packet 1024 to the SFE 111 according to the address of the SFE 111. The address of the SFE 111 may be an IP address of the SFE 111 or a MAC address of the SFE 111. If the SF node 122 and the SFE 111 are located on a same network device, the address of the SFE 111 may be an I/O address for connecting to the SF node 122. Alternatively, the address of the SFE 111 may be an identifier of an interface for connecting to the SFE 111 by the SF node 122.

For example, the SF node 122 has two working manners, the two working manners of the SF node 122 are the same as those of the SF node 121, and details are not described herein again.

309. The SFE 111 obtains an ID of the SF node 122 and a fault tracing detection response packet 1034.

For example, a receiving unit 1116 in the SFE 111 receives the fault tracing detection request packet 1024 from the SF node 122. A fifth obtaining unit 1117 in the SFE 111 obtains the ID of the SF node 122. The fifth obtaining unit 1117 may obtain the ID of the SF node 122 according to an interface for receiving the fault tracing detection request packet 1024 and a correspondence between the ID of the SF node 122 stored in the storage unit in the SFE 111 and the interface for receiving the fault tracing detection request packet 1024. Alternatively, the fifth obtaining unit 1117 may obtain the ID of the SF node 122 from the fault tracing detection request packet 1024. Alternatively, if the second parameter in the fault tracing detection request packet 1024 is used to identify the SF node 122, the fifth obtaining unit 1117 uses the second parameter as the ID of the SF node 122, to obtain the ID of the SF node 122.

For example, the fifth obtaining unit 1117 in the SFE 111 may generate the fault tracing detection response packet 1034 according to the path ID, the obtained ID of the SF node 122, and the address of the service classifier 131. Alternatively, the fifth obtaining unit 1117 in the SFE 111 may add the obtained ID of the SF node 122 to a received fault tracing detection response packet generated by another device, to obtain the fault tracing detection response packet 1034. Alternatively, the fifth obtaining unit 1117 in the SFE 111 may replace, with the ID of the SF node 122, the ID that is of the SF node 121 in the fault tracing detection response packet 1032 and is obtained by the first obtaining unit 1107, to obtain the fault tracing detection response packet 1034.

Optionally, the fifth obtaining unit 1117 in the SFE 111 may further add the second parameter, the ID of the SFE 111, and/or an ID of an SF node 123 to the fault tracing detection response packet 1034, which helps the service classifier 131 to learn a location of the SF node 122 on the service chain. The ID of the SFE 111 and the ID of the SF node 123 may be stored in the storage unit in the SFE 111. The fifth obtaining unit 1117 may obtain the ID of the SF node 123 according to a correspondence between the ID of the SF node 123 in the storage unit and the path ID.

310. The SFE 111 sends the fault tracing detection response packet 1034 to the service classifier 131.

A method for sending the fault tracing detection response packet 1034 by the SFE 111 to the service classifier 131 in step 310 is the same as a method for sending the fault tracing detection response packet 1032 by the SFE 111 to the service classifier 131 in step 305, and details are not described herein again.

For example, a third receiving unit 1312 in the service classifier 131 receives the fault tracing detection response packet 1034. The first determining unit 1313 in the service classifier 131 may determine, according to the ID of the SF node 122 in the fault tracing detection response packet 1034, that the service chain passes through the SF node 122 connected to the SFE 111, and a link between the SF node 122 and the SFE 111 is normal. After the fault tracing detection response packet 1032 and the fault tracing detection response packet 1034 are received, the first determining unit 1313 may further determine that the SF node 122 on the service chain is located on a next hop of the SF node 121.

311. The SFE 111 obtains a fault tracing detection request packet 1025.

For example, the fourth obtaining unit 1113 in the SFE 111 is configured to obtain the fault tracing detection request packet 1025. The fault tracing detection request packet 1025 includes a third parameter, the path ID of the service chain, and the address of the service classifier 131. An SF node identified by using the third parameter is a next-hop SF node of an SF node, on the service chain, identified by using the second parameter. When the second parameter is the ID of the SF node 122, the third parameter is the ID of the SF node 123 on the service chain. When the second parameter is the ID of the SF node 121, the third parameter is the ID of the SF node 122.

For example, a method for obtaining the fault tracing detection request packet 1025 by the fourth obtaining unit 1113 in the SFE 111 includes: when the ID of the SF node 122 included in the fault tracing detection request packet 1024 is the same as the third parameter, the fourth obtaining unit 1113 in the SFE 111 may use the fault tracing detection request packet 1024 as the fault tracing detection request packet 1025. Alternatively, the fault tracing detection request packet 1024 includes the second parameter, and the fourth obtaining unit 1113 in the SFE 111 replaces the second parameter in the fault tracing detection request packet 1024 with the third parameter, to obtain the fault tracing detection request packet 1025. Alternatively, the fourth obtaining unit 1113 in the SFE 111 is configured to generate the fault tracing detection request packet 1025 according to the obtained third parameter, the path ID, and the address of the service classifier 131.

For example, the storage unit in the SFE 111 stores a correspondence between the ID of the SF node 123 and the interface for receiving the fault tracing detection request packet 1024. The fourth obtaining unit 1113 in the SFE 111 obtains the third parameter according to the interface for receiving the fault tracing detection request packet 1024 and an ID that is of an SF node and is corresponding to the interface for receiving the fault tracing detection request packet 1024.

312. The SFE 111 sends the fault tracing detection request packet 1025 to an SFE 112.

For example, a third forwarding entry stored in the storage unit in the SFE 111 includes the path ID, the third parameter, and an address of a first device. In step 312, the address of the first device is an address of the SFE 112. The second determining unit 1114 in the SFE 111 determines, according to the third parameter and the path ID, to forward the fault tracing detection request packet 1025 according to the third forwarding entry. The third sending unit 1115 in the SFE 111 sends the fault tracing detection request packet 1025 to the SFE 112 according to the address of the SFE 112. Alternatively, a third forwarding entry stored in the storage unit in the SFE 111 includes the path ID, an identifier of the interface for receiving the fault tracing detection request packet 1024, and an address of a first device. In step 312, the address of the first device is an address of the SFE 112. The second determining unit 1114 in the SFE 111 may determine, according to the path ID and the identifier of the interface for receiving the fault tracing detection request packet 1024, to forward the fault tracing detection request packet 1025 according to the third forwarding entry.

313. The SFE 112 sends the fault tracing detection request packet 1025 to an SF node 123.

For example, a first communications unit 1105 in the SFE 112 is configured to receive the fault tracing detection request packet 1025 from the SFE 111. A forwarding entry includes the path ID, the third parameter, and an address of the SF node 123. The first communications unit 1105 determines, according to the path ID and the third parameter, to forward the fault tracing detection request packet 1025 according to the forwarding entry. The first communications unit 1105 sends the fault tracing detection request packet 1025 to the SF node 123 according to the address of the SF node 123. Alternatively, a forwarding entry includes the path ID and an address of the SF node 123. The first communications unit 1105 determines, according to the path ID, to forward the fault tracing detection request packet 1025 according to the forwarding entry.

314. The SF node 123 sends a fault tracing detection request packet 1026 to the SFE 112.

For example, the SF node 123 has two working manners, the two working manners of the SF node 123 are the same as the working manners of the SF node 122, and details are not described herein again. The SF node 123 may include content included in the SF node 121, and a method for sending the fault tracing detection request packet 1026 by the SF node 123 to the SFE 112 in step 314 is the same as that in step 303. Alternatively, the SF node 123 may include content included in the SF node 122, and a method for sending the fault tracing detection request packet 1026 by the SF node 123 to the SFE 112 in step 314 is the same as that in step 308.

315. The SFE 112 obtains an ID of the SF node 123 and a fault tracing detection response packet 1036.

The SFE 112 may include content included in the SFE 111, and a method for obtaining the ID of the SF node 123 and the fault tracing detection response packet 1036 by the SFE 112 in step 315 is the same as that in step 304 or step 309.

Optionally, the SFE 112 may further add the third parameter and/or an ID of the SFE 112 to the fault tracing detection response packet 1036, which helps the service classifier 131 to learn a location of the SF node 123 on the service chain.

316. The SFE 112 sends the fault tracing detection response packet 1036 to the service classifier 131.

The SFE 112 may include the content included in the SFE 111, and a method for sending the fault tracing detection response packet 1036 by the SFE 112 to the service classifier 131 in step 316 is the same as that in step 305 or step 310.

For example, the third receiving unit 1312 in the service classifier 131 receives the fault tracing detection response packet 1036 from the SFE 112. After the fault tracing detection response packet 1036 is received, the first determining unit 1313 in the service classifier 131 determines that the service chain passes through the SF node 123, and a link between the SF node 123 and the SFE 112 is normal. The first determining unit 1313 in the service classifier 131 obtains the ID of the SF node 123 from the fault tracing detection response packet 1036, and further learns, according to the obtained ID of the SF node 121 and the obtained ID of the SF node 122, an order in which the service chain passes through the SF node 121, the SF node 122, and the SF node 123.

In the foregoing embodiment, the service classifier 131 may obtain an ID of an SF node from a received fault tracing detection response packet, which is helpful to learn, according to the obtained ID of the SF node and an order of obtaining IDs of SF nodes, an SF node that a packet actually passes through when being forwarded and an order of SF nodes that the packet passes through. In addition, the service classifier 131 may further obtain at least one of the first parameter, the third parameter, the ID of the SFE 111, or the ID of the SF node 121 from the received fault tracing detection response packet, which is helpful to accurately determine a location of an SF node on the service chain.

To detect a segment of a link included in the service chain, the fault tracing detection request packet 1021 further includes an ID of an SF node used as an end point. The ID of the SF node used as the end point may be from the detection instruction. The SF node used as the end point is a last SF node to be detected on the service chain. Optionally, a fourth adding unit 1310 in the service classifier 131 may add the ID of the SF node used as the end point to the fault tracing detection request packet 1021. Correspondingly, the fault tracing detection request packets 1022, 1023, 1024, 1025, and 1026 may further include the ID of the SF node used as the end point. Optionally, between step 305 and step 306, the following is further included: when the ID, in the fault tracing detection request packet 1022, of the SF node used as the end point is the same as the ID of the SF node 121, a control unit 1120 in the SFE 111 controls the fourth obtaining unit 1113 in the SFE 111 not to perform step 306; or when the ID, in the fault tracing detection request packet 1022, of the SF node used as the end point is different from the ID of the SF node 121, a control unit 1120 in the SFE 111 controls the fourth obtaining unit 1113 in the SFE 111 to perform step 306.

Optionally, after the fourth obtaining unit 1113 in the SFE 111 performs step 306, between step 310 and step 311, the following is further included: the control unit 1120 in the SFE 111 determines whether the ID, in the fault tracing detection request packet 1024, of the SF node used as the end point is the same as the ID of the SF node 122. If the ID of the SF node used as the end point is the same as the ID of the SF node 122, the control unit 1120 in the SFE 111 may control the fourth obtaining unit 1113 in the SFE 111 not to perform step 311. If the ID of the SF node used as the end point is different from the ID of the SF node 122, the control unit 1120 in the SFE 111 may control the fourth obtaining unit 1113 in the SFE 111 to perform step 311.

Optionally, between step 301 and step 302, the following is further included: the first obtaining unit 1107 in the SFE 111 may obtain a fault tracing detection response packet 1031. The fault tracing detection response packet 1031 may include the ID of the SFE 111, the path ID of the service chain, and the address of the service classifier 131. The first sending unit 1106 in the SFE 111 sends the fault tracing detection response packet 1031 to the service classifier 131. A method for obtaining the fault tracing detection response packet 1031 by the first obtaining unit 1107 is the same as a method for obtaining the fault tracing detection response packet 1032 by the first obtaining unit 1107, and details are not described herein again. The first sending unit 1106 in the SFE 111 sends the fault tracing detection response packet 1031 to the service classifier 131. A second receiving unit 1311 in the service classifier 131 receives the fault tracing detection response packet 1031 from the SFE 111. The first determining unit 1313 in the service classifier 131 determines, according to the fault tracing detection response packet 1031, that the service chain passes through the SFE 111, and a link between the service classifier 131 and the SFE 111 is normal.

Optionally, between step 312 and step 313, the following is further included: a first obtaining unit 1107 in the SFE 112 may obtain a fault tracing detection response packet 1035. The fault tracing detection response packet 1035 includes the ID of the SFE 112, the path ID of the service chain, and the address of the service classifier 131. A first sending unit 1106 in the SFE 112 sends the fault tracing detection response packet 1035 to the service classifier 131. A second receiving unit 1311 in the service classifier 131 receives the fault tracing detection response packet 1035 from the SFE 112. The first determining unit 1313 in the service classifier 131 determines, according to the fault tracing detection response packet 1035, that the service chain passes through the SFE 112, and a link between the service classifier 131 and the SFE 112 is normal.

Optionally, the fault tracing detection request packet 1021 further includes a node list. The node list in the fault tracing detection request packet 1021 is used to indicate an SF node, between the device for initiating fault detection and the SFE 112, that the service chain passes through and an order of SF nodes that the service chain passes through. For the node list, when the fault tracing detection request packet 1021 is generated, content included in the node list may be determined according to a start SF node on which fault detection is performed. An SF node included in the node list and an order of SF nodes that the service chain passes through increase as an SF node that a fault tracing detection request packet including the node list passes through increases. If an SFE on the service chain updates the node list in the fault tracing detection request packet 1021, the method provided in Embodiment 2 further includes the following optional steps.

Before the service classifier 131 sends the fault tracing detection request packet 1021 in step 301, the following is further included: a second adding unit 1308 in the service classifier 131 adds the node list to the fault tracing detection request packet 1021. The node list in the fault tracing detection request packet 1021 includes the ID of the previous-hop SF node of the SF node 121 on the service chain. For example, if the SF node 121 is a first SF node on the service chain, the node list in the fault tracing detection request packet 1021 may include a preset ID. The preset ID is used to identify that the previous-hop SF node of the SF node on the service chain does not exist. If the SF node 121 is a second SF node on the service chain, the node list in the fault tracing detection request packet 1021 includes an ID of the first SF node on the service chain.

Before the SFE 111 sends the fault tracing detection response packet 1032 in step 305, the following is further included: a first parameter updating unit 1118 in the SFE 111 may obtain an updated node list based on the node list in the fault tracing detection request packet 1021. The first obtaining unit 1107 may add the updated node list to the fault tracing detection response packet 1032. The node list in the fault tracing detection response packet 1032 is a list obtained by adding the ID of the SF node 121 to the node list in the fault tracing detection request packet 1021. An order of all SF nodes in the node list in the fault tracing detection response packet 1032 is the same as an order of all the SF nodes on the service chain. According to an order of IDs of SF nodes included in the node list in the fault tracing detection response packet 1032, an order of SF nodes that a service packet passes through when being forwarded on the service chain may be learned. The first determining unit 1313 in the service classifier 131 may learn, according to the node list in the received fault tracing detection response packet 1032, an SF node that the service chain passes through and an order of SF nodes that the service chain passes through. For example, the first parameter updating unit 1118 may add the ID of the SF node 121 to the node list obtained from the fault tracing detection request packet 1021, to obtain the updated node list. If the node list in the fault tracing detection request packet 1021 includes the preset ID, the updated node list includes the ID of the SF node 121 and the preset ID. The ID of the SF node 121 included in the updated node list may be located before or after the preset ID. According to the foregoing order and the preset ID, it may be learned that the SF node 121 is the first SF node on the service chain.

Before the SFE 111 sends the fault tracing detection request packet 1023 in step 307, the following is further included: the fault tracing detection request packet 1023 obtained by the fourth obtaining unit 1113 in the SFE 111 further includes the node list in the fault tracing detection response packet 1032. For example, if the node list in the fault tracing detection response packet 1032 includes the preset ID and the ID of the first SF node 121, the node list in the fault tracing detection request packet 1023 includes the preset ID and the ID of the first SF node 121.

Before the SFE 111 sends the fault tracing detection response packet 1034 in step 310, the following is further included: the first parameter updating unit 1118 in the SFE 111 may obtain an updated node list based on the node list in the fault tracing detection request packet 1023. The first obtaining unit 1107 may add the updated node list in step 309 to the fault tracing detection response packet 1034. The node list in the fault tracing detection response packet 1034 is a list obtained by adding the ID of the SF node 122 to the node list in the fault tracing detection request packet 1023. In this way, the first determining unit 1313 in the service classifier 131 may learn, according to the node list in the received fault tracing detection response packet 1034, an SF node that the service chain passes through and an order of SF nodes that the service chain passes through. For example, the first parameter updating unit 1118 may add the ID of the SF node 122 to the node list in the fault tracing detection request packet 1023, to obtain the updated node list, that is, the node list in the fault tracing detection response packet 1034. The node list in the fault tracing detection response packet 1034 includes the preset ID, the ID of the first SF node 121, and the ID of the second SF node 122. If the ID of the first SF node 121 included in the node list in the fault tracing detection response packet 1032 is located before the preset ID, the ID of the second SF node 122 included in the node list in the fault tracing detection response packet 1034 is located before the ID of the first SF node 121. If the ID of the first SF node 121 included in the node list in the fault tracing detection response packet 1032 is located after the preset ID, the ID of the second SF node 122 included in the node list in the fault tracing detection response packet 1034 is located after the ID of the first SF node 121. According to the foregoing order, the preset ID, and the ID of the SF node 121, it may be learned that the SF node 122 is the second SF node on the service chain.

Before the SFE 111 sends the fault tracing detection request packet 1025 in step 312, the following is further included: the fault tracing detection request packet 1025 obtained by the fourth obtaining unit 1113 in the SFE 111 may further include the node list in the fault tracing detection response packet 1034. For example, if the node list in the fault tracing detection response packet 1034 includes the preset ID, the ID of the first SF node 121, and the ID of the second SF node 122, the node list in the fault tracing detection request packet 1025 includes the preset ID, the ID of the first SF node 121, and the ID of the second SF node 122.

Before the SFE 112 sends the fault tracing detection response packet 1036 in step 316, the following is further included: the first parameter updating unit 1118 in the SFE 112 may obtain an updated node list based on the node list in the fault tracing detection request packet 1025. A method for obtaining the updated node list by the SFE 112 is the same as a method for obtaining the updated node list by the SFE 111, and details are not described herein again. The first obtaining unit 1107 in the SFE 112 may add the updated node list obtained by the first parameter updating unit 1118 in the SFE 112 to the fault tracing detection response packet 1036. The node list in the fault tracing detection response packet 1036 includes the preset ID, the ID of the SF node 121, the ID of the SF node 122, and the ID of the SF node 123. The preset ID, the ID of the SF node 121, the ID of the SF node 122, and the ID of the SF node 123 are arranged according to a preset order, so that the service classifier 131 learns, according to SF nodes included in the node list in the fault tracing detection response packet 1036 and an order of the SF nodes, an SF node that a packet actually passes through when being forwarded and an order of SF nodes that the packet passes through.

In the foregoing embodiment, an ID of an SF node received by the service classifier 131 is carried in a fault tracing detection response packet in a form of a node list, so that the service classifier 131 can directly learn, according to the node list, an SF node that a packet actually passes through when being forwarded and an order of SF nodes that the packet passes through.

Optionally, the fault tracing detection request packet 1021 further includes a node list. The node list in the fault tracing detection request packet 1021 is used to indicate an SF node, between the device for initiating fault detection and the SFE 112, that the service chain passes through and an order of SF nodes that the service chain passes through. For the node list, when the fault tracing detection request packet 1021 is generated, content included in the node list may be determined according to a start SF node on which fault detection is performed. An SF node included in the node list and an order of SF nodes that the service chain passes through increase as an SF node that a fault tracing detection request packet including the node list passes through increases. If an SF node on the service chain updates the node list in the fault tracing detection request packet 1021, the method provided in Embodiment 2 further includes the following optional steps.

Before the service classifier 131 sends the fault tracing detection request packet 1021 in step 301, the following is further included: a second adding unit 1308 in the service classifier 131 adds the node list to the fault tracing detection request packet 1021. The node list in the fault tracing detection request packet 1021 includes the ID of the previous-hop SF node of the SF node 121 on the service chain. For example, if the SF node 121 is the first SF node on the service chain, the node list in the fault tracing detection request packet 1021 may include a preset TD. The preset ID is used to identify that the previous-hop SF node of the SF node on the service chain does not exist. If the SF node 121 is the second SF node on the service chain, the node list in the fault tracing detection request packet 1021 includes an ID of the first SF node on the service chain.

Before the SF node 121 sends the fault tracing detection request packet 1022 in step 303, the following is further included: the second parameter updating unit 1208 in the SF node 121 may obtain an updated node list based on the node list in the fault tracing detection request packet 1021. The second parameter updating unit 1208 in the SF node 121 may add the updated node list to the fault tracing detection request packet 1022. The node list in the fault tracing detection request packet 1022 is a list obtained by adding the ID of the SF node 121 to the node list in the fault tracing detection request packet 1021. That is, the node list in the fault tracing detection request packet 1022 is the same as the node list in the fault tracing detection response packet 1032 obtained by the SFE 111 in the foregoing embodiment, and details are not described herein again.

Before the SFE 111 sends the fault tracing detection response packet 1032 in step 305, the following is further included: the first obtaining unit 1107 in the SFE 111 may add the node list obtained from the fault tracing detection request packet 1022 to the fault tracing detection response packet 1032.

Before the SFE 111 sends the fault tracing detection request packet 1023 in step 307, the following is further included: the fault tracing detection request packet 1023 obtained by the fourth obtaining unit 1113 in the SFE 111 further includes the node list in the fault tracing detection response packet 1032.

Before the SF node 122 sends the fault tracing detection request packet 1024 in step 308, the following is further included: a second parameter updating unit 1208 in the SF node 122 may obtain an updated node list based on the node list in the fault tracing detection request packet 1023. The second parameter updating unit 1208 in the SF node 122 may add the updated node list to the fault tracing detection request packet 1024. The node list in the fault tracing detection request packet 1024 is a list obtained by adding the ID of the SF node 122 to the node list in the fault tracing detection request packet 1023. That is, the node list in the fault tracing detection request packet 1024 is the same as the node list in the fault tracing detection response packet 1034 obtained by the SFE 111 in the foregoing embodiment, and details are not described herein again.

Before the SFE 111 sends the fault tracing detection response packet 1034 in step 310, the following is further included: the fifth obtaining unit 1117 in the SFE 111 may add the node list obtained from the fault tracing detection request packet 1024 to the fault tracing detection response packet 1034.

Before the SFE 111 sends the fault tracing detection request packet 1025 in step 312, the following is further included: the fault tracing detection request packet 1025 obtained by the fourth obtaining unit 1113 in the SFE 111 further includes the node list in the fault tracing detection response packet 1034.

Before the SF node 123 sends the fault tracing detection request packet 1026 in step 314, the following is further included: a second parameter updating unit 1208 in the SF node 123 may obtain an updated node list based on the node list in the fault tracing detection request packet 1025. The second parameter updating unit 1208 may add the ID of the SF node 123 to the fault tracing detection request packet 1026. That is, the node list in the fault tracing detection request packet 1026 is the same as the node list in the fault tracing detection response packet 1036 obtained by the SFE 112 in the foregoing embodiment, and details are not described herein again.

Before the SFE 112 sends the fault tracing detection response packet 1036 in step 316, the following is further included: a first obtaining unit 1107 in the SFE 112 may further add the node list obtained from the fault tracing detection request packet 1026 to the fault tracing detection response packet 1036.

In comparison with an embodiment in which an SFE obtains an updated node list, in the foregoing embodiment, an SF node obtains an updated node list, which is helpful to reduce burden of the SFE.

Optionally, the fault tracing detection request packet 1021 further includes a reference value. The reference value is greater than or equal to 0. If an SFE on the service chain updates the reference value in the fault tracing detection request packet 1021, the method provided in Embodiment 2 further includes the following optional steps.

Before the service classifier 131 sends the fault tracing detection request packet 1021 in step 301, the following is further included: a third adding unit 1309 in the service classifier 131 may add the reference value to the fault tracing detection request packet 1021. Alternatively, the fault tracing detection request packet 1021 obtained by the service classifier 131 includes the reference value.

Before the SFE 111 sends the fault tracing detection response packet 1032 in step 305, the following is further included: a second parameter updating unit 1119 in the SFE 111 obtains a sequence number of the SF node 121. The sequence number of the SF node 121 is generated according to the reference value and an offset. The offset is greater than 0. For example, the sequence number of the SF node 121 is generated by adding the offset to the reference value, or is generated by subtracting the offset from the reference value. The first obtaining unit 1107 adds the sequence number of the SF node 121 to the fault tracing detection response packet 1032. In this way, the service classifier 131 may learn a location of the SF node on the service chain according to the sequence number of the SF node 121 in the received fault tracing detection response packet 1032. In this embodiment of the present invention, if the sequence number of the SF node 121 may identify the location of the SF node 121 on the service chain, the sequence number of the SF node 121 may be added to the fault tracing detection response packet 1032 as a parameter. The service classifier 131 may learn the location of the SF node 121 on the service chain according to the ID of the SF node 121 and the sequence number of the SF node 121 that are in the fault tracing detection response packet 1032. Alternatively, if the sequence number of the SF node 121 may identify both the SF node 121 and the location of the SF node 121 on the service chain, the sequence number of the SF node 121 may be carried in the fault tracing detection response packet 1032 as the ID of the SF node 121. The service classifier 131 may learn the location of the SF node 121 on the service chain according to the sequence number of the SF node 121 in the fault tracing detection response packet 1032.

Before the SFE 111 sends the fault tracing detection request packet 1023 in step 307, the following is further included: the fault tracing detection request packet 1023 obtained by the fourth obtaining unit 1113 in the SFE 111 further includes the sequence number of the SF node 121.

Before the SFE 111 sends the fault tracing detection response packet 1034 in step 310, the following is further included: the second parameter updating unit 1119 in the SFE 111 is configured to obtain a sequence number of the SF node 122 based on the sequence number of the SF node 121 in the fault tracing detection request packet 1023. For example, the sequence number of the SF node 122 is generated by adding the offset to the sequence number of the SF node 121, or is generated by subtracting the offset from the sequence number of the SF node 121. The first obtaining unit 1107 adds the sequence number of the SF node 122 to the fault tracing detection response packet 1034. In this way, the service classifier 131 may learn a location of the SF node 122 on the service chain according to the sequence number of the SF node 122 in the received fault tracing detection response packet 1034. A function of the sequence number of the SF node 122 may be the same as a function of the sequence number of the SF node 121, and details are not described herein again.

Before the SFE 111 sends the fault tracing detection request packet 1025 in step 312, the following is further included: the fault tracing detection request packet 1025 obtained by the fourth obtaining unit 1113 in the SFE 111 further includes the sequence number of the SF node 122 in the fault tracing detection response packet 1034.

Before the SFE 112 sends the fault tracing detection response packet 1036 in step 316, the following is further included: a second parameter updating unit 1119 in the SFE 112 is configured to obtain a sequence number of the SF node 123 based on the sequence number of the SF node 122 in the fault tracing detection request packet 1025. For example, the sequence number of the SF node 123 is generated by adding the offset to the sequence number of the SF node 122, or is generated by subtracting the offset from the sequence number of the SF node 122. The first obtaining unit 1107 adds the sequence number of the SF node 123 to the fault tracing detection response packet 1036. In this way, the service classifier 131 may learn a location of the SF node 123 on the service chain according to the sequence number of the SF node 123 in the received fault tracing detection response packet 1036. A function of the sequence number of the SF node 123 may be the same as a function of the sequence number of the SF node 121, and details are not described herein again.

In the foregoing embodiment, if a sequence number of an SF node may identify a location of the SF node on the service chain, the sequence number of the SF node may be added to a fault tracing detection response packet as a parameter. The service classifier 131 may accurately learn the location of the SF node on the service chain according to an ID of the SF node and the sequence number of the SF node that are in the fault tracing detection response packet. Alternatively, if a sequence number of an SF node may identify both the SF node and a location of the SF node on the service chain, the sequence number of the SF node may be carried in a fault tracing detection response packet as an ID of the SF node. The service classifier 131 may accurately learn the location of the SF node on the service chain according to the sequence number of the SF node in the fault tracing detection response packet.

Optionally, the fault tracing detection request packet 1021 further includes a reference value. If an SF node on the service chain updates the reference value in the fault tracing detection request packet 1021, the method provided in Embodiment 2 further includes the following optional steps.

Before the service classifier 131 sends the fault tracing detection request packet 1021 in step 301, the following is further included: a third adding unit 1309 in the service classifier 131 may add the reference value to the fault tracing detection request packet 1021. Alternatively, the fault tracing detection request packet 1021 obtained by the service classifier 131 includes the reference value.

Before the SF node 121 sends the fault tracing detection request packet 1022 in step 303, the following is further included: a third parameter updating unit 1209 in the SF node 121 may obtain a sequence number of the SF node 121 based on the reference value in the fault tracing detection request packet 1021. The third parameter updating unit 1209 adds the sequence number of the SF node 121 to the fault tracing detection request packet 1022. A method for obtaining the sequence number of the SF node 121 by the SF node 121 is the same as a method for obtaining the sequence number of the SF node 121 by the SFE 111.

Before the SFE 111 sends the fault tracing detection response packet 1032 in step 305, the following is further included: the first obtaining unit 1107 in the SFE 111 may add the sequence number of the SF node 121 obtained from the fault tracing detection request packet 1022 to the fault tracing detection response packet 1032.

Before the SFE 111 sends the fault tracing detection request packet 1023 in step 307, the following is further included: the fault tracing detection request packet 1023 obtained by the fourth obtaining unit 1113 in the SFE 111 further includes the sequence number of the SF node 121 in the fault tracing detection response packet 1032.

Before the SF node 122 sends the fault tracing detection request packet 1024 in step 308, the following is further included: a third parameter updating unit 1209 in the SF node 122 may obtain a sequence number of the SF node 122 based on the sequence number of the SF node 121 in the fault tracing detection request packet 1023. The third parameter updating unit 1209 may add the sequence number of the SF node 122 to the fault tracing detection request packet 1024. A method for obtaining the sequence number of the SF node 122 by the SF node 122 is the same as a method for obtaining the sequence number of the SF node 122 by the SFE 111.

Before the SFE 111 sends the fault tracing detection response packet 1034 in step 310, the following is further included: the fifth obtaining unit 1117 in the SFE 111 further adds the sequence number of the SF node 122 obtained from the fault tracing detection request packet 1024 to the fault tracing detection response packet 1034.

Before the SFE 111 sends the fault tracing detection request packet 1025 in step 312, the following is further included: the fault tracing detection request packet 1025 obtained by the fourth obtaining unit 1113 in the SFE 111 further includes the sequence number of the SF node 122 in the fault tracing detection response packet 1034.

Before the SF node 123 sends the fault tracing detection request packet 1026 in step 314, the following is further included: a third parameter updating unit 1209 in the SF node 123 is configured to obtain a sequence number of the SF node 123 based on the sequence number of the SF node 122 in the fault tracing detection request packet 1025. The third parameter updating unit 1209 adds the sequence number of the SF node 123 to the fault tracing detection request packet 1026. A method for obtaining the sequence number of the SF node 123 by the SF node 123 is the same as a method for obtaining the sequence number of the SF node 123 by the SFE 112.

Before the SFE 112 sends the fault tracing detection response packet 1036 in step 316, the following is further included: the first obtaining unit 1107 in the SFE 112 may further add the sequence number of the SF node 123 obtained from the fault tracing detection request packet 1026 to the fault tracing detection response packet 1036.

In comparison with an embodiment in which an SFE obtains a sequence number of an SF node, in the foregoing embodiment, an SF node obtains a sequence number of the SF node itself, which is helpful to reduce burden of the SFE.

Embodiment 3

Figure 15:
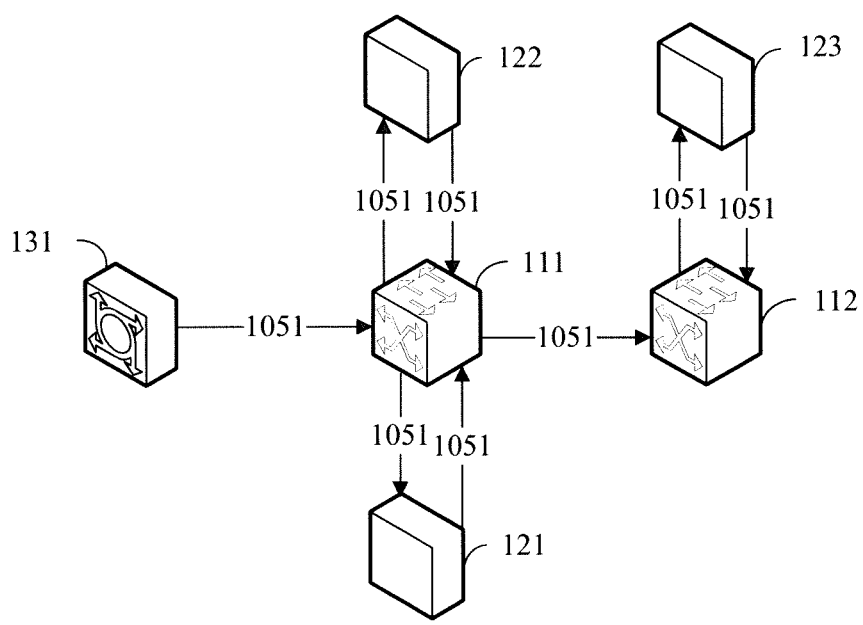
FIG. 15 is a schematic structural diagram of a network according to Embodiment 3 of the present invention.

FIG. 15 is a schematic structural diagram of a network according to Embodiment 3 of the present invention. A structure of the network shown in FIG. 15 is the same as the structure of the network shown in FIG. 10. A type of a packet sent by each apparatus in the network shown in FIG. 15 is different from a type of a packet sent by each apparatus in the network shown in FIG. 10. On a basis of the service forwarding apparatus shown in FIG. 4 or FIG. 11, a second receiving unit (not shown in the figure) and a fourth sending unit (not shown in the figure) may be added to any SFE in the network shown in FIG. 15. Optionally, the service forwarding apparatus further includes a reporting unit. On a basis of the device for initiating fault detection shown in FIG. 6 or FIG. 12, a fourth receiving unit (not shown in the figure) may be added to a service classifier 131 used as a device for initiating fault detection in the network shown in FIG. 15. On a basis of the service function apparatus shown in FIG. 8 or FIG. 13, an obtaining unit (not shown in the figure) and a forwarding unit (not shown in the figure) may be added to any SF node in the network shown in FIG. 15.

Figure 16:
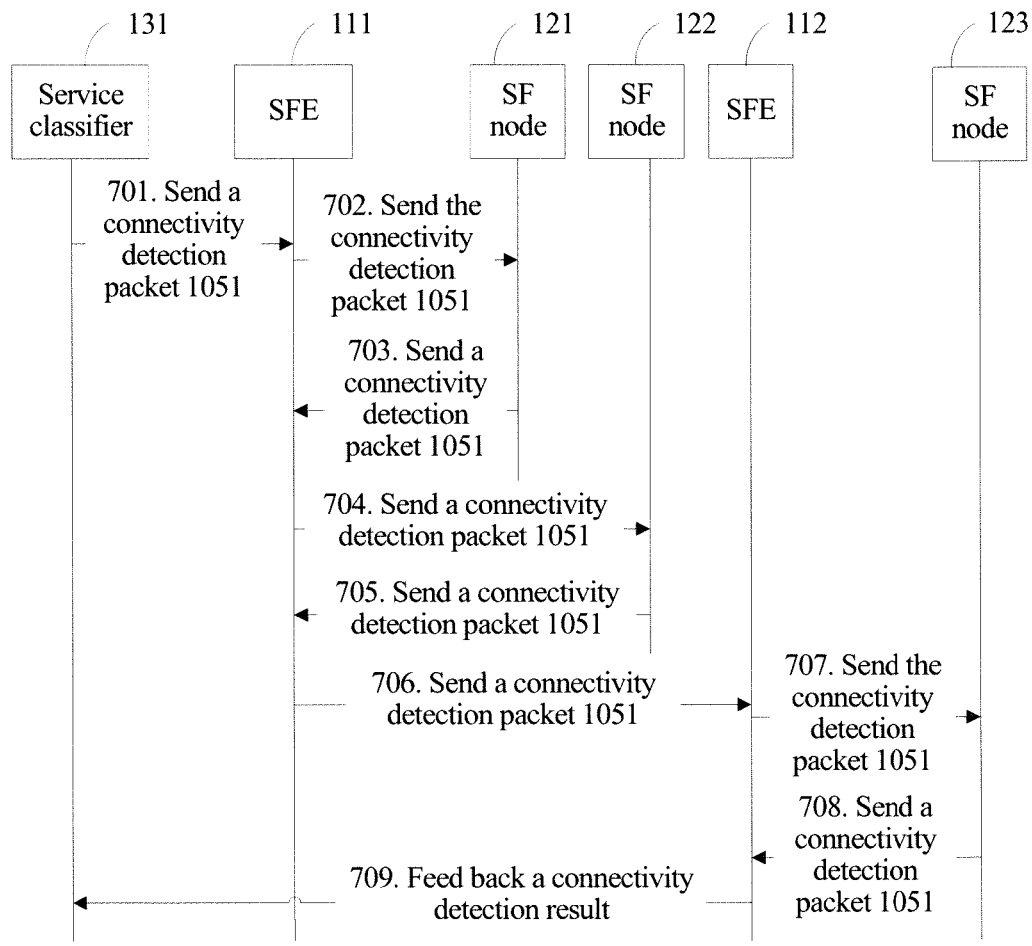
FIG. 16 is a flowchart of a service chain fault detection method according to Embodiment 3 of the present invention.

FIG. 16 is a flowchart of a service chain fault detection method according to Embodiment 3 of the present invention. The method provided in Embodiment 3 may be executed before the method provided in Embodiment 1 or Embodiment 2, and the method provided in Embodiment 3 is optional in a service chain fault detection process. With reference to the network shown in FIG. 15, the following describes in detail the service chain fault detection method provided in Embodiment 3.

701. A service classifier 131 sends a connectivity detection packet 1051 to an SFE 111.

For example, a fourth receiving unit in the service classifier 131 used as a device for initiating fault detection may receive an instruction used to enable connectivity detection on a service chain, to generate the connectivity detection packet 1051. Alternatively, a fourth receiving unit in the service classifier 131 used as a device for initiating fault detection obtains the connectivity detection packet 1051 from another device connected to the service classifier 131. The connectivity detection packet 1051 includes a path ID of the service chain. A sending unit 1306 in the service classifier 131 may send the connectivity detection packet 1051 to the SFE 111 according to an address of the SFE 111 included in a forwarding entry.

702. The SFE 111 sends the connectivity detection packet 1051 to an SF node 121.

For example, a second receiving unit in the SFE 111 receives the connectivity detection packet 1051 from the service classifier 131. A fourth sending unit in the SFE 111 sends the connectivity detection packet 1051 to the SF node 121 according to an address of the SF node 121 included in a first forwarding entry. The first forwarding entry may be the same as the first forwarding entry mentioned in Embodiment 1 or Embodiment 2, and details are not described herein again.

703. The SF node 121 sends a connectivity detection packet 1051 to the SFE 111.

For example, an obtaining unit in the SF node 121 receives the connectivity detection packet 1051 from the SFE 111. A forwarding unit in the SF node 121 sends the connectivity detection packet 1051 to the SFE 111. A method for sending the connectivity detection packet 1051 by the forwarding unit in the SF node 121 is the same as a method used by the sending unit 1206 in Embodiment 1 or Embodiment 2, and details are not described herein again.

704. The SFE 111 sends a connectivity detection packet 1051 to an SF node 122.

A method for sending the connectivity detection packet 1051 by the SFE 111 to the SF node 122 in step 704 is the same as a method in step 702.

705. The SF node 122 sends a connectivity detection packet 1051 to the SFE 111.

The SF node 122 includes content included in the SF node 121. A method for sending the connectivity detection packet 1051 by the SF node 122 to the SFE 111 in step 705 is the same as the method in step 703.

706. The SFE 111 sends a connectivity detection packet 1051 to an SFE 112.

A method for sending the connectivity detection packet 1051 by the SFE 111 to the SFE 112 in step 706 is the same as the method in step 702.

707. The SFE 112 sends the connectivity detection packet 1051 to an SF node 123.

The SFE 112 includes content included in the SFE 111. A method for sending the connectivity detection packet 1051 by the SFE 112 to the SF node 123 in step 707 is the same as the method in step 702.

708. The SF node 123 sends a connectivity detection packet 1051 to the SFE 112.

The SF node 123 includes the content included in the SF node 121. A method for sending the connectivity detection packet 1051 by the SF node 123 to the SFE 112 in step 708 is the same as the method in step 703.

709. The SFE 112 feeds back a connectivity detection result to the service classifier 131.

If the SFE 112 is a last SFE on the service chain, and a second receiving unit in the SFE 112 receives the connectivity detection packet 1051 from the SF node 123 within a preset time, a reporting unit in the SFE 112 feeds back, to the service classifier 131, a connectivity detection result indicating link normality. If a second receiving unit in the SFE 112 does not receive the connectivity detection packet 1051 from the SF node 123 within a preset time or does not receive the connectivity detection packet 1051 from the SFE 111 within a preset time, a reporting unit in the SFE 112 feeds back, to the service classifier 131, a connectivity detection result indicating link abnormality. Link abnormality may indicate a link fault.

Optionally, the SFE 112 may feed back the connectivity detection result to a device that sends the instruction used to enable connectivity detection on the service chain, instead of feeding back the connectivity detection result to the service classifier 131 in step 709.

Optionally, if the SFE 112 is not the last SFE on the service chain, a fourth sending unit in the SFE 112 further continues, according to a forwarding entry, to forward the connectivity detection packet 1051 to a next device on the service chain, and the last SFE on the service chain performs an operation of feeding back the connectivity detection result.

In the foregoing embodiment of the present invention, a tunnel is established between two adjacent nodes of all nodes included in the service chain, and a fault tracing detection request packet, a fault tracing detection response packet, and a connectivity detection packet may be transmitted through the tunnel between the two adjacent nodes. For example, if a tunnel is established between the SFE 111 and the SF node 121, the fault tracing detection request packet, the fault tracing detection response packet, and the connectivity detection packet may be transmitted through the tunnel between the SFE 111 and the SF node 121. If a tunnel is established between the SFE 111 and the SF node 122, the fault tracing detection request packet, the fault tracing detection response packet, and the connectivity detection packet may be transmitted through the tunnel between the SFE 111 and the SF node 122. If a tunnel is established between the SFE 111 and the SFE 112, the fault tracing detection request packet, the fault tracing detection response packet, and the connectivity detection packet may be transmitted through the tunnel between the SFE 111 and the SFE 112.

Figure 17:
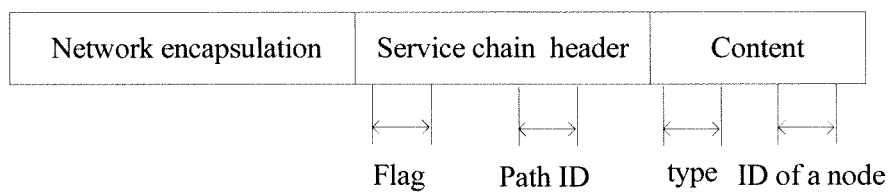
FIG. 17 is a schematic diagram of an OAM packet according to an embodiment of the present invention.

In the foregoing embodiment of the present invention, the fault tracing detection request packet, the fault tracing detection response packet, and the connectivity detection packet belong to an operation, administration and maintenance (OAM) packet. The OAM packet may carry a parameter for identifying a packet type, so that an apparatus that receives a packet learns, according to the parameter that is for identifying a packet type and is carried in the OAM packet, that the received packet is one of the fault tracing detection request packet, the fault tracing detection response packet, or the connectivity detection packet. FIG. 17 is a schematic diagram of an OAM packet according to an embodiment of the present invention. The OAM packet shown in FIG. 17 includes network encapsulation (network encapsulation), a service chain header (service chain header), and content (content). The network encapsulation included in the OAM packet may be Ethernet encapsulation, UDP encapsulation, Generic Routing Encapsulation (GRE), Multiprotocol Label Switching (MPLS) encapsulation, or the like. A flag (flag) bit included in the service chain header may be used to identify that the OAM packet is a packet used for service chain detection. One or more bits included in the service chain header may be used to identify a path ID of a service chain. One or more bits included in the content in the OAM packet may be used to identify a type (type) of the OAM packet, and a value of the type may identify that the OAM packet is a fault tracing detection request packet, a fault tracing detection response packet, or a connectivity detection packet. For example, when the value of the type is 0, it indicates that the OAM packet is a fault tracing detection request packet; when the value of the type is 1, it indicates that the OAM packet is a fault tracing detection response packet; when the value of the type is 2, it indicates that the OAM packet is a connectivity detection packet. The one or more bits included in the content in the OAM packet may be used to identify an ID of a node. The node may be a node included in the service chain, for example, a node such as an SF node 121 or an SFE 111 on the service chain.

If the OAM packet shown in FIG. 17 is a fault tracing detection response packet, and the fault tracing detection response packet is carried in an ICMP packet, content in the ICMP packet includes the service chain header and the content in the OAM packet in FIG. 17. A packet header of the ICMP packet further includes a type parameter, and the type parameter is used to identify that the ICMP packet belongs to a fault tracing detection response packet. If the OAM packet shown in FIG. 17 is a fault tracing detection response packet, and the fault tracing detection response packet is carried in a UDP packet, content in the UDP packet includes the service chain header and the content in the OAM packet in FIG. 17. A port number included in a packet header of the UDP packet is used to identify that a type of the UDP packet belongs to a fault tracing detection response packet.

The foregoing processor may be a microprocessor or the processor may be any conventional processor. The steps of the method disclosed with reference to the embodiments of the present invention may be directly performed by a hardware processor, or may be performed by using a combination of hardware in the processor and a software module. When it is implemented by using software, code that implements the foregoing functions may be stored in a computer-readable medium, where the computer-readable medium includes a computer storage medium. The storage medium may be any available medium accessible to a computer. The following is used as an example but is not limited: The computer readable medium may be a random access memory (RAM), a read-only memory (ROM), an electrically erasable programmable read-only memory (EEPROM), a compact disc read-only memory (CD-ROM) or another optical disc storage, a disk storage medium or another magnetic storage device, or any other medium that can be used to carry or store expected program code in a form of an instruction or data structure and can be accessed by a computer. The computer-readable medium may be a compact disc (CD), a laser disc, an optical disc, a digital video disc (DVD), a floppy disk, or a Blu-ray disc.

Persons of ordinary skill in the art may understand that all or some of the steps of the foregoing method embodiments may be implemented by a program instructing relevant hardware. The foregoing program may be stored in a computer readable storage medium. When the program runs, the steps of the method embodiments are performed. The foregoing storage medium may be at least one of the following mediums: any medium that can store program code, such as a ROM, a RAM, a magnetic disk, or an optical disc.

Finally, it should be noted that the foregoing embodiments are merely intended for exemplarily describing the technical solutions of the present invention, but not for limiting the present invention. Although the present invention and benefits of the present invention are described in detail with reference to the foregoing embodiments, persons of an ordinary skill in the art should understand that they may still make modifications to the technical solutions described in the foregoing embodiments or make equivalent replacements to some technical features thereof, without departing from the scope of the claims of the present invention.

The invention claimed is:

1. A service chain fault detection method, wherein the method comprises:
   obtaining, by a service forwarding entity (SFE), a first fault tracing detection request packet, wherein the first fault tracing detection request packet comprises a path identifier (ID) and an address of a device for initiating fault detection, and the path ID is used to identify a path of a service chain;
   determining, by the SFE according to the path ID, to forward the first fault tracing detection request packet according to a first forwarding entry, wherein the first forwarding entry comprises the path ID and an address of a first service function (SF) node;
   sending, by the SFE, the first fault tracing detection request packet to the first SF node according to the address of the first SF node;
   receiving, by the SFE, a second fault tracing detection request packet from the first SF node, wherein the second fault tracing detection request packet comprises the path ID and the address of the device for initiating fault detection;
   obtaining, by the SFE, an ID of the first SF node; and
   sending, by the SFE, a first fault tracing detection response packet to the device for initiating fault detection, wherein the first fault tracing detection response packet comprises the path ID, the ID of the first SF node, and the address of the device for initiating fault detection.

2. The method according to claim 1, wherein the first fault tracing detection request packet further comprises a first parameter, the first parameter is used to identify the first SF node or is used to identify a previous-hop SF node of the first SF node on the service chain, and the first forwarding entry further comprises the first parameter; and
   the determining, by the SFE according to the path ID, to forward the first fault tracing detection request packet according to a first forwarding entry comprises: determining, by the SFE according to the first parameter and the path ID, to forward the first fault tracing detection request packet according to the first forwarding entry.

3. The method according to claim 2, wherein the first fault tracing detection request packet further comprises a time to live (TTL) field;
   after the receiving, by the SFE, a second fault tracing detection request packet from the first SF node, the method further comprises: obtaining, by the SFE, a TTL parameter, wherein the TTL parameter is data obtained after a value of the TTL field in the first fault tracing detection request packet is updated; and
   the sending, by the SFE, a first fault tracing detection response packet to the device for initiating fault detection further comprises: when the TTL parameter is equal to a preset value, sending, by the SFE, the first fault tracing detection response packet to the device for initiating fault detection.

4. The method according to claim 3, wherein the method further comprises:
   when the TTL parameter is not equal to the preset value, obtaining, by the SFE, a third fault tracing detection request packet, wherein the third fault tracing detection request packet comprises a second parameter, the path ID, a TTL field, and the address of the device for initiating fault detection, and the second parameter is used to identify a next-hop SF node of an SF node, on the service chain, identified by using the first parameter;
   determining, by the SFE according to the second parameter and the path ID, to forward the third fault tracing detection request packet according to a second forwarding entry, wherein the second forwarding entry comprises the path ID, the second parameter, and an address of a first device, the first device is a next-hop SFE of the SFE on the service chain or a second SF node, and the second SF node is a next-hop SF node of the first SF node on the service chain; and
   sending, by the SFE, the third fault tracing detection request packet to the first device according to the address of the first device.

5. The method according to claim 2, wherein before the sending, by the SFE, a first fault tracing detection response packet to the device for initiating fault detection, the method further comprises:
   sending, by the SFE, a second fault tracing detection response packet to the device for initiating fault detection, wherein the second fault tracing detection response packet comprises the path ID, an ID of the SFE, and the address of the device for initiating fault detection.

6. The method according to claim 2, wherein after the sending, by the SFE, a first fault tracing detection response packet to the device for initiating fault detection, the method further comprises:
obtaining, by the SFE, a fourth fault tracing detection request packet, wherein the fourth fault tracing detection request packet comprises a second parameter, the path ID, and the address of the device for initiating fault detection, and the second parameter is used to identify a next-hop SF node of an SF node, on the service chain, identified by using the first parameter;
determining, by the SFE according to the second parameter and the path ID, to forward the fourth fault tracing detection request packet according to a second forwarding entry, wherein the second forwarding entry comprises the path ID, the second parameter, and an address of a first device, the first device is a next-hop SFE of the SFE on the service chain or a second SF node, and the second SF node is a next-hop SF node of the first SF node on the service chain; and
sending, by the SFE, the fourth fault tracing detection request packet to the first device according to the address of the first device.

7. The method according to claim 6, wherein the first device is the second SF node, and the method further comprises:
receiving, by the SFE, a fifth fault tracing detection request packet from the second SF node, wherein the fifth fault tracing detection request packet comprises the path ID and the address of the device for initiating fault detection;
obtaining, by the SFE, an ID of the second SF node according to the fifth fault tracing detection request packet; and
sending, by the SFE, a third fault tracing detection response packet to the device for initiating fault detection, wherein the third fault tracing detection response packet comprises the path ID, the ID of the second SF node, and the address of the device for initiating fault detection.

8. The method according to claim 1, wherein the first fault tracing detection request packet further comprises a node list, and the node list comprises an ID of the previous-hop SF node of the first SF node on the service chain; and
before the sending, by the SFE, a first fault tracing detection response packet to the device for initiating fault detection, the method further comprises:
obtaining, by the SFE, an updated node list, wherein the updated node list is a list generated after the ID of the first SF node is added to the node list, and an order of all SF nodes comprised in the updated node list is the same as an order of all the SF nodes on the service chain; and
adding, by the SFE, the updated node list to the first fault tracing detection response packet.

9. A service forwarding apparatus, comprising:
a memory storing instructions; and
a processor coupled to the memory to execute the instructions to:
obtain a first fault tracing detection request packet, wherein the first fault tracing detection request packet comprises a path identifier (ID) and an address of a device for initiating fault detection, and the path ID is used to identify a path of a service chain;
determine, according to the path ID, to forward the first fault tracing detection request packet according to a first forwarding entry, wherein the first forwarding entry comprises the path ID and an address of a first service node (SF) node;
send the first fault tracing detection request packet to the first SF node according to the address of the first SF node;
receive a second fault tracing detection request packet from the first SF node, wherein the second fault tracing detection request packet comprises the path ID and the address of the device for initiating fault detection;
obtain an ID of the first SF node; and
send a first fault tracing detection response packet to the device for initiating fault detection, wherein the first fault tracing detection response packet comprises the path ID, the ID of the first SF node, and the address of the device for initiating fault detection.

10. The service forwarding apparatus according to claim 9, wherein the first fault tracing detection request packet further comprises a first parameter, the first parameter is used to identify the first SF node or is used to identify a previous-hop SF node of the first SF node on the service chain, and the first forwarding entry further comprises the first parameter; and
wherein the processor is further instructed to determine, according to the first parameter and the path ID, to forward the first fault tracing detection request packet according to the first forwarding entry.

11. The service forwarding apparatus according to claim 10, wherein the first fault tracing detection request packet further comprises a time to live (TTL) field;
wherein the processor is further instructed to:
obtain a TTL parameter, wherein the TTL parameter is data obtained after a value of the TTL field in the first fault tracing detection request packet is updated; and
when the TTL parameter is equal to a preset value, send the first fault tracing detection response packet to the device for initiating fault detection.

12. The service forwarding apparatus according to claim 11, wherein the processor is further instructed to:
when the TTL parameter is not equal to the preset value, obtain a third fault tracing detection request packet, wherein the third fault tracing detection request packet comprises a second parameter, the path ID, a TTL field, and the address of the device for initiating fault detection, the second parameter is used to identify a next-hop SF node of an SF node, on the service chain, identified by using the first parameter, and a value of the TTL field in the third fault tracing detection request packet is the TTL parameter;
determine, according to the second parameter and the path ID, to forward the third fault tracing detection request packet according to a second forwarding entry, wherein the second forwarding entry comprises the path ID, the second parameter, and an address of a first device, the first device is a next-hop service forwarding entity (SFE) of the service forwarding apparatus on the service chain or a second SF node, and the second SF node is a next-hop SF node of the first SF node on the service chain; and
send the third fault tracing detection request packet to the first device according to the address of the first device.

13. The service forwarding apparatus according to claim 10, wherein the processor is further instructed to send a second fault tracing detection response packet to the device for initiating fault detection, wherein the second fault tracing detection response packet comprises the path ID, an ID of the service forwarding apparatus, and the address of the device for initiating fault detection.

14. The service forwarding apparatus according to claim 10, wherein the processor is further instructed to:
   obtain a fourth fault tracing detection request packet, wherein the fourth fault tracing detection request packet comprises a second parameter, the path ID, and the address of the device for initiating fault detection, and the second parameter is used to identify a next-hop SF node of an SF node, on the service chain, identified by using the first parameter;
   determine, according to the second parameter and the path ID, to forward the fourth fault tracing detection request packet according to a second forwarding entry, wherein the second forwarding entry comprises the path ID, the second parameter, and an address of a first device, the first device is a next-hop service forwarding entity (SFE) of the service forwarding apparatus on the service chain or a second SF node, and the second SF node is a next-hop SF node of the first SF node on the service chain; and
   send the fourth fault tracing detection request packet to the first device according to the address of the first device.

15. The service forwarding apparatus according to claim 14, wherein the first device is the second SF node, and the processor is further instructed to:
   receive a fifth fault tracing detection request packet from the second SF node, wherein the fifth fault tracing detection request packet comprises the path ID and the address of the device for initiating fault detection; and
   obtain an ID of the second SF node according to the fifth fault tracing detection request packet; and
   send a third fault tracing detection response packet to the device for initiating fault detection, wherein the third fault tracing detection response packet comprises the path ID, the ID of the second SF node, and the address of the device for initiating fault detection.

16. The service forwarding apparatus according to claim 9, wherein the first fault tracing detection request packet further comprises a node list, and the node list comprises an ID of the previous-hop SF node of the first SF node on the service chain;
   wherein the processor is further instructed to:
      obtain an updated node list, wherein the updated node list is a list generated after the ID of the first SF node is added to the node list, and an order of all SF nodes comprised in the updated node list is the same as an order of all the SF nodes on the service chain; and
      add the updated node list to the first fault tracing detection response packet.

17. A service function (SF) apparatus, wherein the SF apparatus comprising:
   a memory storing instructions; and
   a processor coupled to the memory to execute the instructions to:
   receive a first fault tracing detection request packet from a service forwarding entity (SFE), wherein the first fault tracing detection request packet comprises a time to live (TTL) field, a path identifier (ID) and an address of a device for initiating fault detection, and the path ID is used to identify a path of a service chain;
   obtain a TTL parameter, wherein the TTL parameter is data obtained after a value of the TTL field comprised in the first fault tracing detection request packet is updated; and
   use the TTL parameter as a value of a TTL field comprised in a second fault tracing detection request packet, wherein the second fault tracing detection request packet comprises the path ID, the TTL field and the address of the device for initiating fault detection; and
   send the second fault tracing detection request packet to the SFE.

18. A service function (SF) apparatus, wherein the SF apparatus comprising:
   a memory storing instructions; and
   a processor coupled to the memory to execute the instructions to:
   receive a first fault tracing detection request packet from a service forwarding entity (SFE), wherein the first fault tracing detection request packet comprises a path identifier (ID), a node list and an address of a device for initiating fault detection, and the path ID is used to identify a path of a service chain, the node list comprises an ID of the previous-hop SF node of the SF apparatus on the service chain; and
   obtain an updated node list, wherein the updated node list is a list generated after the ID of the SF apparatus is added to the node list, and an order of all SF nodes in the updated node list is the same as an order of all the SF nodes on the service chain; and
   add the updated node list to a second fault tracing detection request packet, wherein the second fault tracing detection request packet comprises the path ID, the updated node list and the address of the device for initiating fault detection; and
   send the second fault tracing detection request packet to the SFE.

* * * * *

UNITED STATES PATENT AND TRADEMARK OFFICE
CERTIFICATE OF CORRECTION

PATENT NO. : 10,181,989 B2
APPLICATION NO. : 15/360234
DATED : January 15, 2019
INVENTOR(S) : Xu et al.

It is certified that error appears in the above-identified patent and that said Letters Patent is hereby corrected as shown below:

On the Title Page

Item (57), in Column 2, under "Abstract", Line 7, delete "ID" and insert -- (ID) --, therefor.

In the Specification

In Column 1, Line 30, delete "(SFE)." and insert -- (SFEs). --, therefor.

In Column 5, Line 26, delete "ID" and insert -- (ID) --, therefor.

In Column 6, Line 53, delete "ID" and insert -- (ID) --, therefor.

In Column 7, Line 40, delete "ID" and insert -- (ID) --, therefor.

In Column 12, Line 15, delete "ID" and insert -- (ID) --, therefor.

In Column 32, Line 45, delete "ill" and insert -- 111 --, therefor.

In Column 41, Line 64, delete "TD." and insert -- ID. --, therefor.

In the Claims

In Column 52, in Claim 9, Line 5, delete "service node" and insert -- service function --, therefor.

Signed and Sealed this
Sixth Day of September, 2022

Katherine Kelly Vidal
*Director of the United States Patent and Trademark Office*